United States Patent
Uenuma et al.

(10) Patent No.: US 7,284,782 B2
(45) Date of Patent: Oct. 23, 2007

(54) VIEW ADJUSTMENT METHOD AND VIEW ADJUSTMENT DEVICE FOR A VEHICLE

(75) Inventors: Kenya Uenuma, Yokohama (JP); Keijiro Iwao, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 163 days.

(21) Appl. No.: 11/150,298

(22) Filed: Jun. 13, 2005

(65) Prior Publication Data

US 2005/0280275 A1 Dec. 22, 2005

(30) Foreign Application Priority Data

Jun. 21, 2004 (JP) ............................ P2004-182740
Dec. 22, 2004 (JP) ............................ P2004-371541

(51) Int. Cl.
*B60J 1/02* (2006.01)

(52) U.S. Cl. .................... 296/84.1; 296/96.19

(58) Field of Classification Search ............... 296/84.1, 296/96.19; 359/242, 265, 275
See application file for complete search history.

(56) References Cited

U.S. PATENT DOCUMENTS

| | | | | |
|---|---|---|---|---|
| 1,156,578 A | * | 10/1915 | Benecke .................. | 296/96.19 |
| 1,678,479 A | * | 7/1928 | Patten et al. ............. | 359/837 |
| 1,773,040 A | * | 8/1930 | Harden ..................... | 296/84.1 |
| 2,187,027 A | * | 1/1940 | Harvey ..................... | 296/97.7 |
| 2,253,766 A | * | 8/1941 | Crowell .................... | 296/97.7 |
| 2,289,144 A | * | 7/1942 | Rossell et al. ........... | 296/96.19 |
| 3,276,813 A | * | 10/1966 | Shaw, Jr. .................. | 296/96.19 |
| 4,555,434 A | * | 11/1985 | Kunert ...................... | 428/194 |
| 5,040,838 A | * | 8/1991 | Yoshizawa ................ | 296/84.1 |
| 5,172,100 A | * | 12/1992 | Iino .......................... | 345/7 |
| 5,716,694 A | * | 2/1998 | Jacquemet ................ | 428/192 |
| 6,842,292 B1 | * | 1/2005 | Sugiyama et al. ........ | 359/630 |
| 7,100,960 B2 | * | 9/2006 | Iwao et al. ............... | 296/84.1 |
| 7,159,924 B2 | * | 1/2007 | Ito et al. ................... | 296/96.19 |
| 2004/0239141 A1 | * | 12/2004 | Iwao et al. ............... | 296/84.1 |
| 2005/0046222 A1 | * | 3/2005 | Ito et al. ................... | 296/96.19 |
| 2005/0280275 A1 | * | 12/2005 | Uenuma et al. .......... | 296/84.1 |
| 2006/0158715 A1 | * | 7/2006 | Furusawa et al. ........ | 359/265 |
| 2007/0102950 A1 | * | 5/2007 | Uematsu et al. ......... | 296/96.19 |

FOREIGN PATENT DOCUMENTS

| | | | | |
|---|---|---|---|---|
| JP | 02117413 A | * | 5/1990 | ............. 296/96.19 |
| JP | 2000-211355 | | 8/2000 | |

* cited by examiner

*Primary Examiner*—D. Glenn Dayoan
*Assistant Examiner*—Paul Chenevert
(74) *Attorney, Agent, or Firm*—McDermott Will & Emery LLP

(57) ABSTRACT

A view adjustment portion includes a vertex at a position offset from a driver between a position opposed to the driver and a center position of the vehicle and includes right and left edges uniformly sloped down from the vertex toward each side in the vehicle width direction. On the interior surface of the view adjustment portion, textures densest and smallest in the vicinity of the vertex are provided. This can prevent the driver's visual focus to be directed to the vicinity of the vertex T and guide the driver's visual focus in the travel direction of the vehicle. Accordingly, it is possible to prevent the driver from feeling disturbance by a portion of the view adjustment portion around the vertex.

20 Claims, 24 Drawing Sheets

TRAVEL DIRECTION

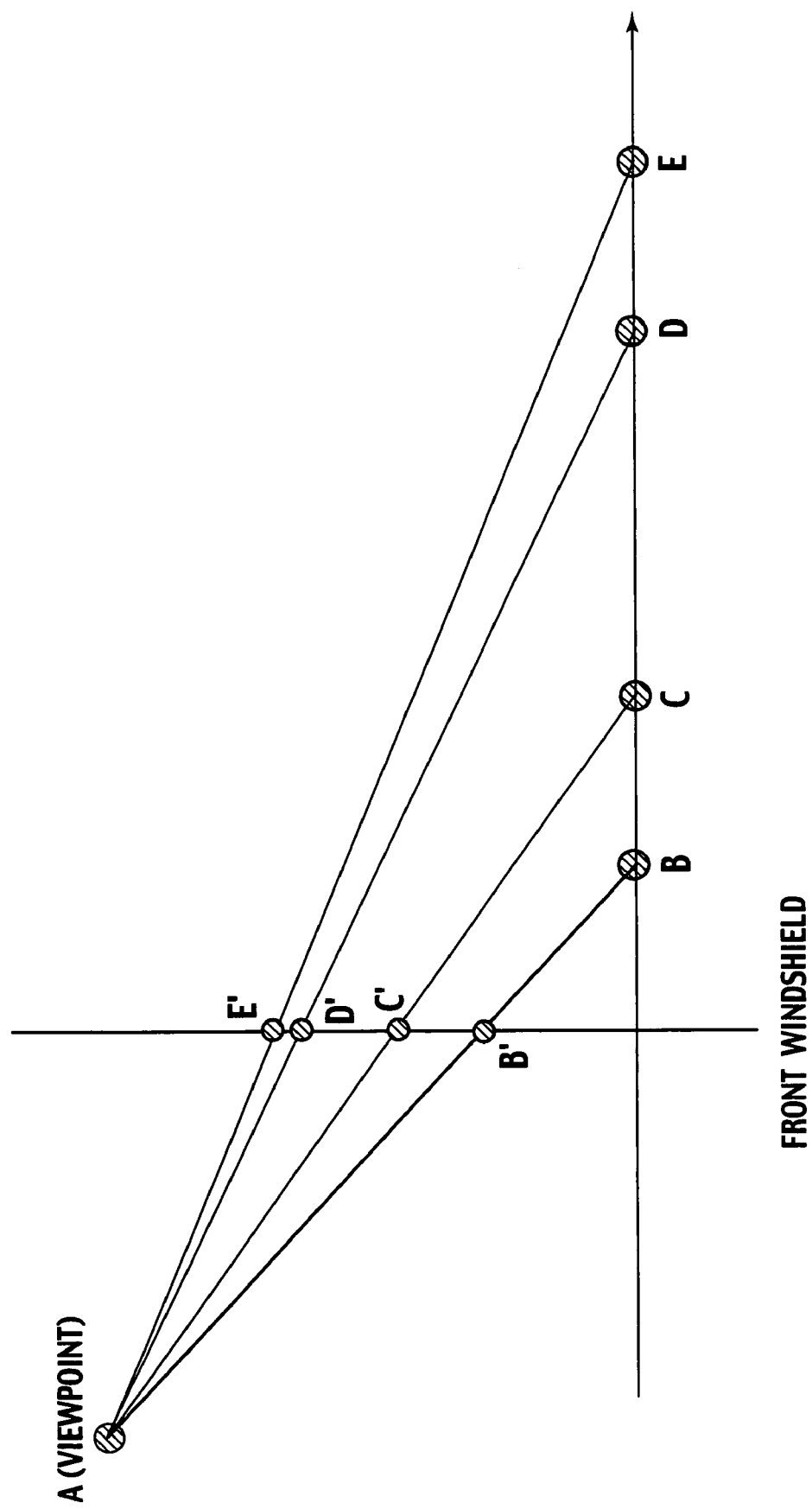

DIRECTION OF SPATIAL FREQUENCY

POWER (LOGARITHMIC AXIS)

HORIZONTAL SPATIAL FREQUENCY (LOGARITHMIC AXIS)

TEXTURE (SPARSE)    TEXTURE (DENSE)

HIGH DENSITY

OBLIQUELY-VIEWED DIRECTION

TRAVEL DIRECTION

VIEW ADJUSTMENT METHOD AND VIEW ADJUSTMENT DEVICE FOR A VEHICLE

BACKGROUND OF THE INVENTION

The present invention relates to a view adjustment method and a view adjustment device for a vehicle in which a front windshield is provided with a view adjustment portion in a lower part thereof to adjust a driver's front field of view.

As a conventional view adjustment method for a vehicle, as disclosed in the Japanese Patent Laid-Open Publication No. 2000-211355, there has been known a method of screening a lower part of the front windshield and adjusting the driver's front field of view to enhance safety in driving vehicles.

SUMMARY OF THE INVENTION

However, the conventional view adjustment method for a vehicle is configured to form the view adjustment portion by screening the lower part of the front windshield. When driver's head is displaced relative to the vehicle body and the view adjustment portion moves in the driver's field of view, such as a case where the vehicle traveling straight goes into a turn, the driver sometimes feels disturbance by the view adjustment portion.

The present invention was made to solve the aforementioned problem, and an object of the present invention is to provide a view adjustment method and a view adjustment device for a vehicle which are capable of preventing the driver from feeling disturbance by the view adjustment portion.

To solve the aforementioned problem, in a view adjustment method and a view adjustment device for a vehicle according to the present invention, textures defined by any one of color, luminosity, and unevenness are provided for a part of or an entire view adjustment portion to guide the driver's visual focus in the travel direction of the vehicle.

With the view adjustment method and view adjustment device for a vehicle according to the present invention, it is possible to prevent the driver's visual focus to be directed to a specific position of the view adjustment portion and accordingly prevent the driver from feeling disturbance by the view adjustment portion.

BRIEF DESCRIPTION OF THE DRAWINGS

FIG. 16 is a view for explaining a method of determining an arrangement position of the texture in the application example of the view adjustment method for a vehicle as the fourth embodiment of the present invention.

DETAILED DESCRIPTION OF THE PREFERRED EMBODIMENTS

Hereinafter, a description is given of a view adjustment method for a vehicle as first to seventh embodiments of the present invention in detail with reference to the drawings.

Figure 1:
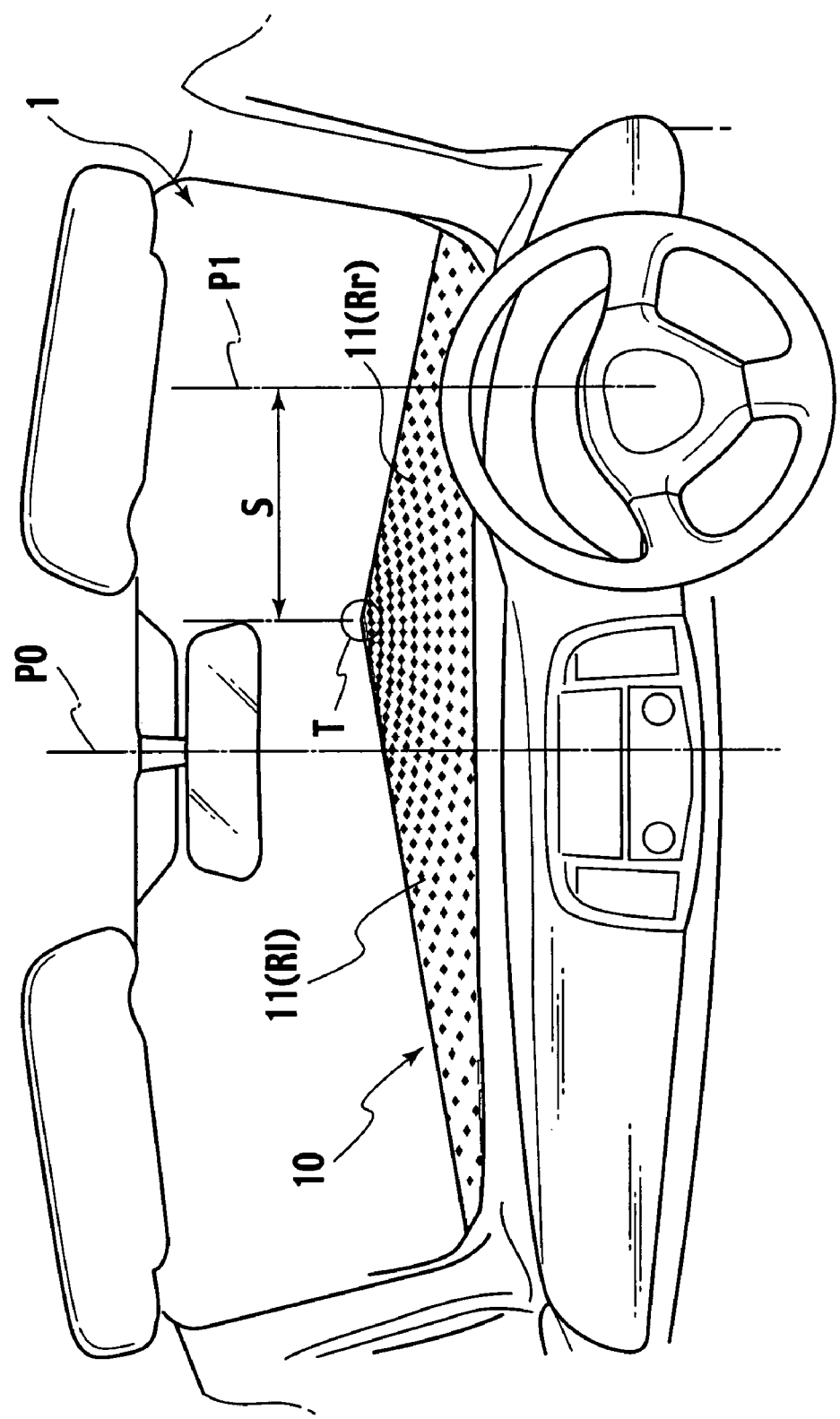
FIG. 1 is a view for explaining a view adjustment method for a vehicle as a first embodiment of the present invention.

In the view adjustment method for a vehicle as the first embodiment of the present invention, as shown in FIG. 1, a view adjustment portion 10 is provided in a lower part of a front windshield 1, and a front field of view from the driver is adjusted by means of the view adjustment portion 10. The view adjustment portion 10 is formed as follows:

1) A vertex T is arranged at a position offset by a distance S from a position P1 opposed to the driver between the position P1 and a center position P0 of a vehicle.
2) Left and right edges Rl and Rr are uniformly sloped from the vertex T toward each side in the vehicle width direction.
3) A separating line 11 is formed of the vertex T and the left and right edges Rl and Rr to adjust a field of view in the lower part of the front windshield 1.

Figure 2:
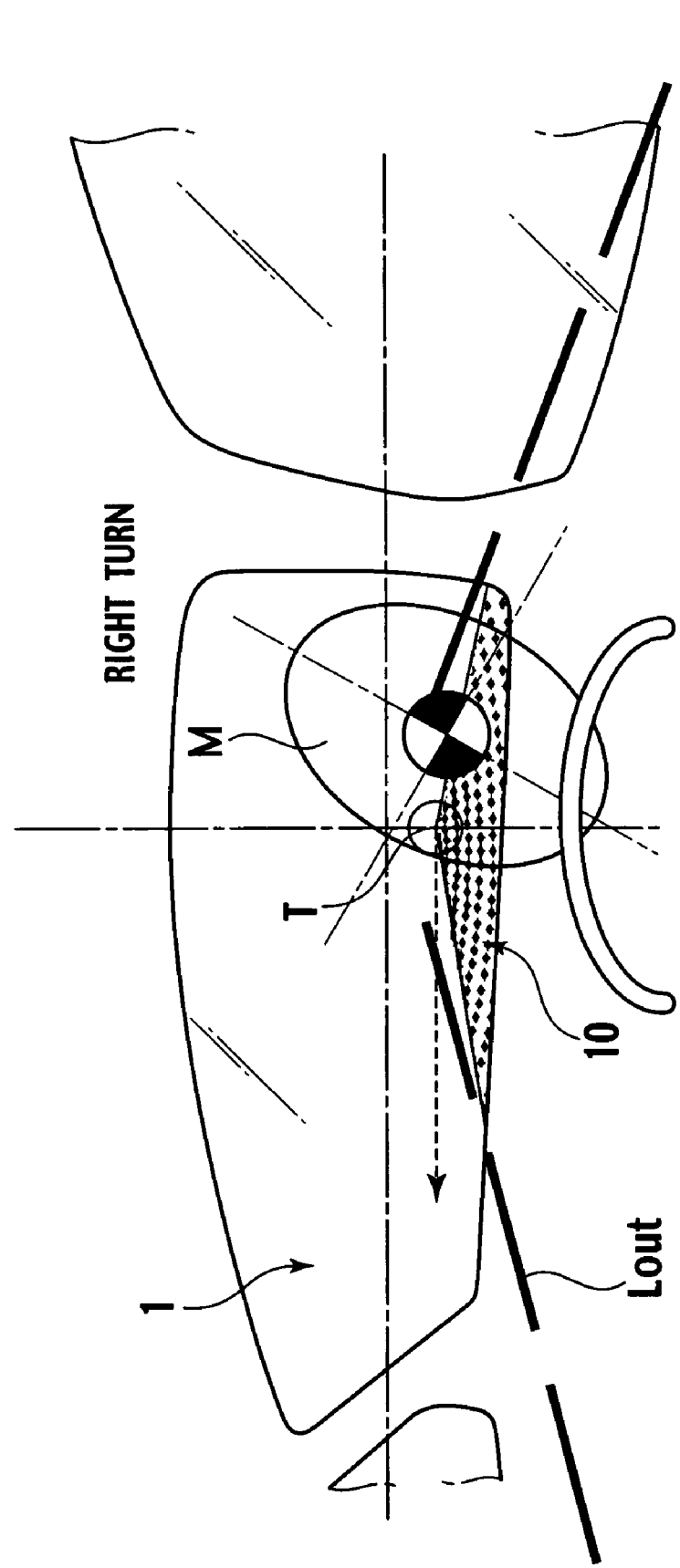
FIG. 2 is a view for explaining a relationship between a separating line and a front field of view viewed from a driver in the view adjustment method for a vehicle as the first embodiment of the present invention.
Figure 3:
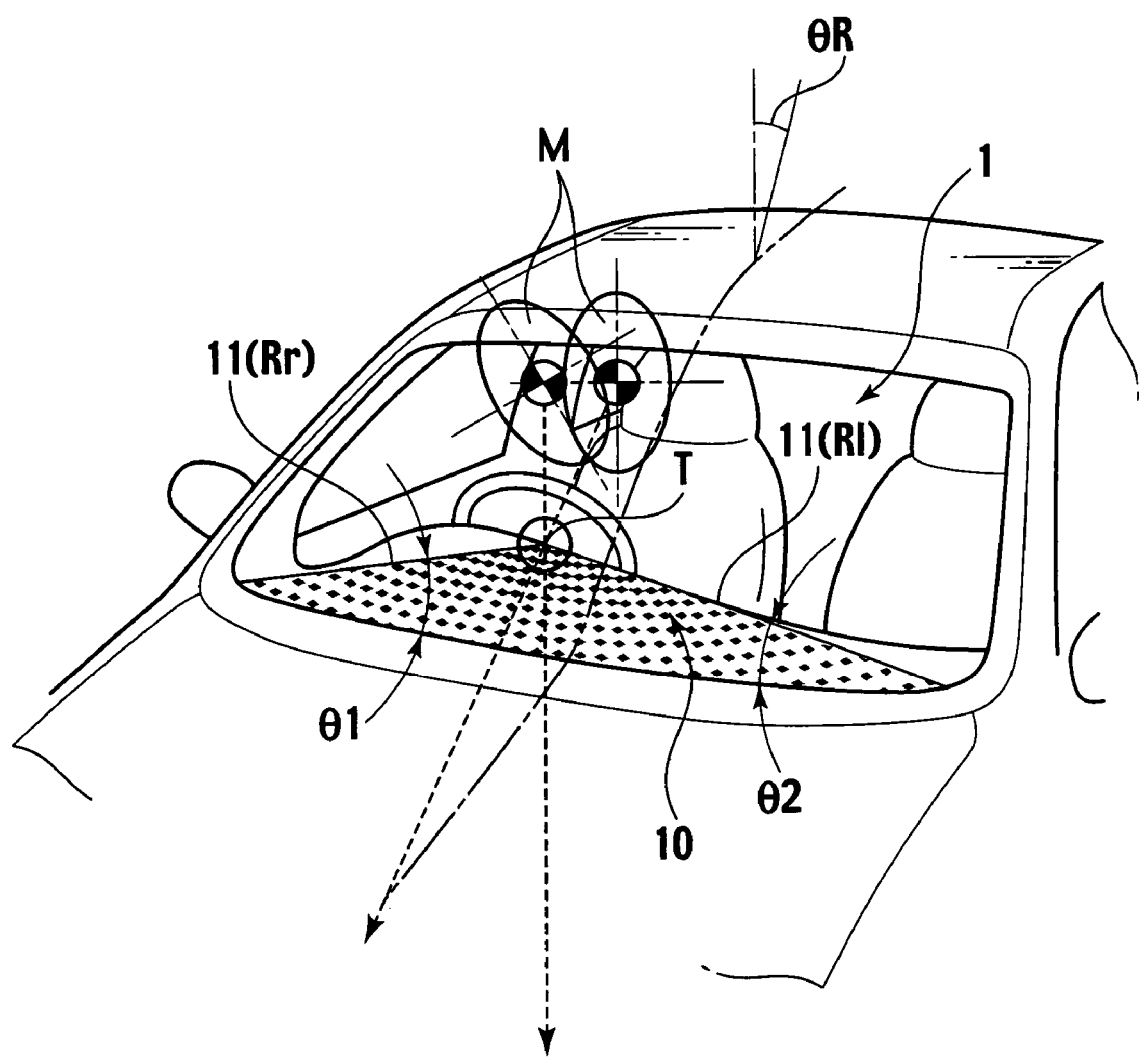
FIG. 3 is a view for explaining a relationship between a line of sight of the driver and a vertex of a separating line in the view adjustment method for a vehicle as the first embodiment of the present invention.

The vertex T of the view adjustment portion 10 is arranged as shown in FIG. 2 such that during a right turn in the case of a right hand drive vehicle (during a left turn in the case of a left hand drive vehicle), a line of sight connecting the viewpoint of the driver M in a turning attitude and the vertex T extends beyond a turning outside line Lout. As shown in FIG. 3, angles θ1 and θ2, each of which is a maximum angle formed by the horizontal line and the edge on the driver M side, that is, the right edge Rr in the right hand drive vehicle and the left edge Rl in the left hand drive vehicle, are set larger than a roll angle θR of the vehicle.

Figure 4A:
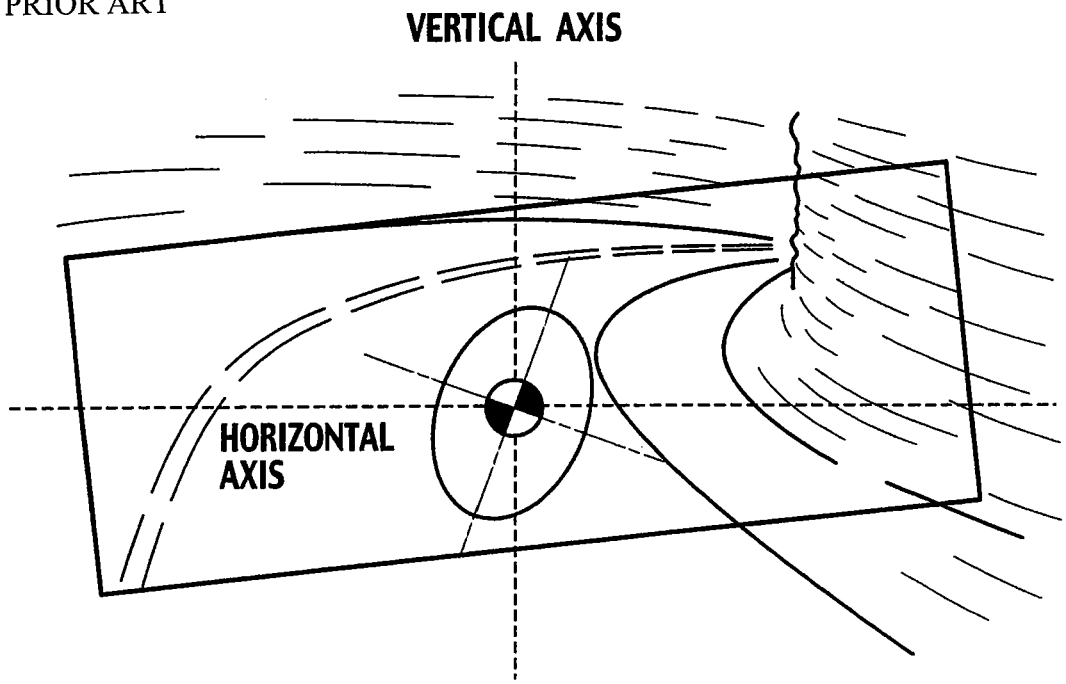
FIGS. 4A and 4B are views for explaining the conventional view adjustment method for a vehicle.
Figure 4B:
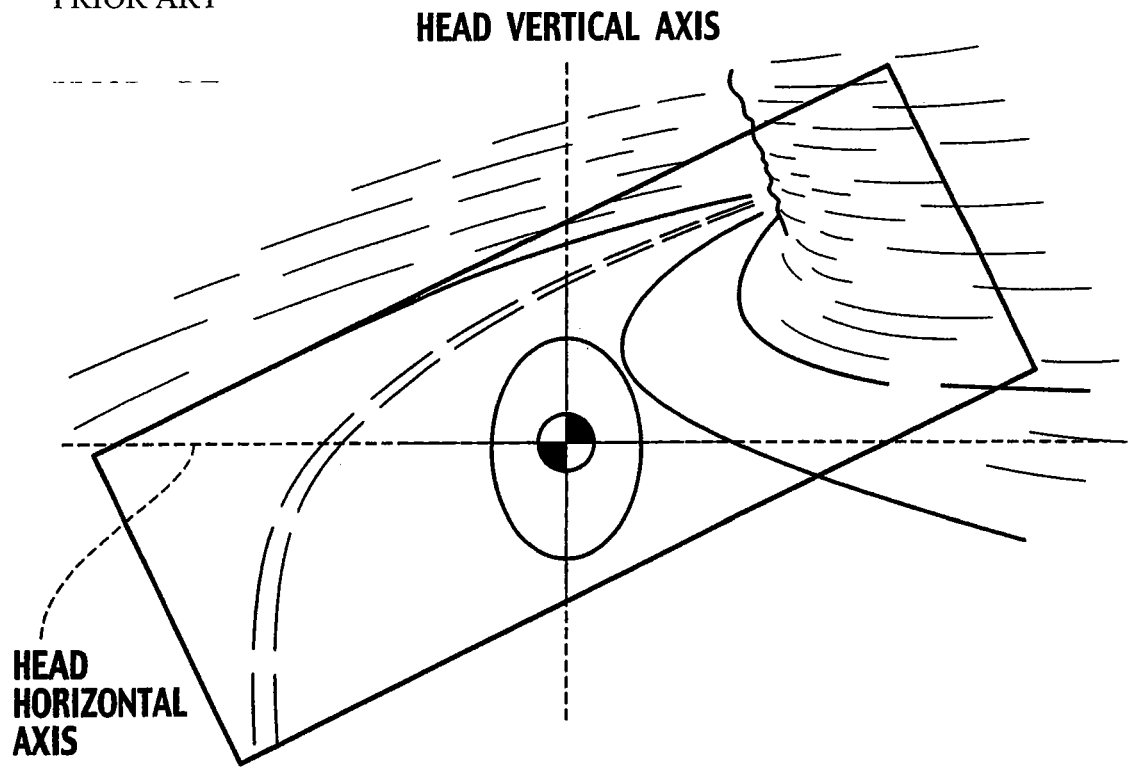

In the conventional view adjustment method for a vehicle, the separating line at the upper edge of the view adjustment portion screening a lower part of the front windshield extends in a straight line in the vehicle width direction. As shown in FIG. 4A, therefore, during a right turn in a curved road, the vehicle rolls to the left while the driver's head inclines to the right against a turning lateral acceleration in a coordinate system having vertical and horizontal axes based on the Earth's gravity. Viewing a sight based on a head coordinate system at this time, as shown in FIG. 4B, the front field of view rolls greater than the roll angle of the vehicle. At this time, the driver adjusts an inclination of his/her head such that a vector sum of the gravity acceleration and the turning lateral acceleration is directed in a direction close to the vertical axis of the head. However, this position is not always stable and varies. This variation results in an unstable driving attitude, which causes unstable steering. This unstable steering promotes the variation in the turning lateral acceleration and makes the inclination of the head more unstable, thus resulting in a vicious circle.

Figure 5:
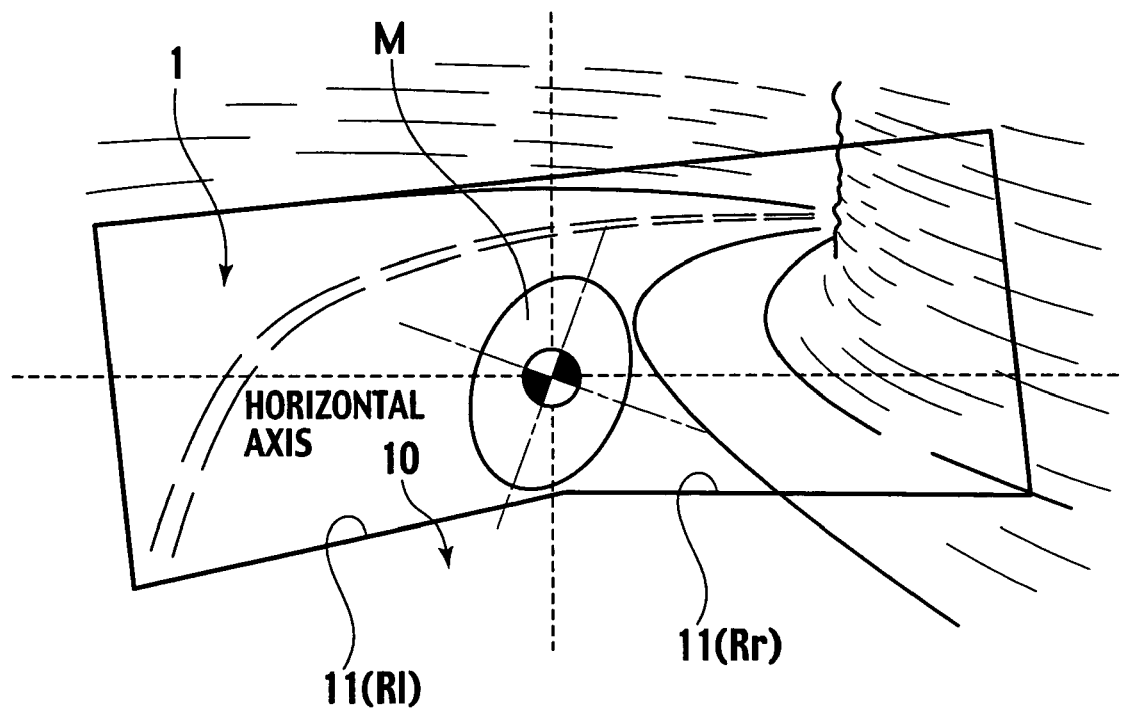
FIG. 5 is a view for explaining a front field of view in a right turn in the view adjustment method for a vehicle as the first embodiment of the present invention.
Figure 6:
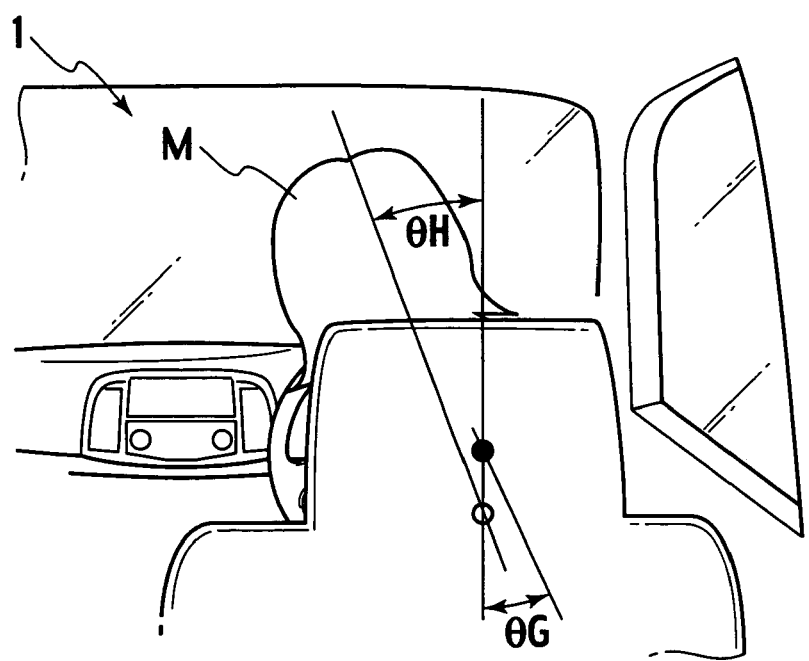
FIG. 6 is a view for explaining a relationship between a head angle and a pendulum angle during a turn of the vehicle in the view adjustment method for a vehicle as the first embodiment of the present invention.

On the contrary, in the view adjustment method for a vehicle as the first embodiment of the present invention, as described above, the separating line 11 constituting the view adjustment portion 10 is uniformly sloped down from the vertex T, which is arranged at the position offset from the driver, toward each side in the vehicle width direction. Accordingly, as shown in FIG. 5, the separating line 11 can prevent the front field of view from inclining and accordingly prevent the fluctuation in the inclination θH of the head during a turn (see FIG. 6). FIG. 6 is a view for explaining a relationship between a head angle θH and a pendulum angle θG during a turn of the vehicle in the view adjustment method for a vehicle. The driving attitude is thus stabilized, and the unstable steering is suppressed.

It was found that, in the case where the view adjustment portion 10 was provided in a lower part of the front windshield 1, when the driver's head was displaced relative to the vehicle body and the view adjustment field moved within the driver's field of view, such as the case where the vehicle traveling straight went into a turn, the driver's line of sight and attention were directed to the view adjustment portion 10 and that the driver felt a portion of the view adjustment portion 10 around the vertex T. As a result of vigorous researches for this phenomenon, the inventors of the present invention acquired knowledge that the cause of this phenomenon was because movement of the vertex T appeared within the driver's field of view as an afterimage to guide the driver's eyes to the vicinity of the vertex T and the driver's eyes were focused on the vicinity of the vertex T.

The inventors therefore focused on the human property regarding depth perception based on the thus-obtained knowledge and achieved the following technical idea. Guiding the driver's visual focus in the travel direction of the vehicle by use of a "texture gradient phenomenon", which is the most important next to the motion parallax in sensing movement, can prevent the driver from feeling disturbance by a portion of the view adjustment portion 10 around the vertex T. In this specification, the texture gradient phenomenon means that a texture higher in density and finer appears further away and a texture lower in density and less finer appears closer (for more details, see "Ecological Approach to Visual Perception" by J. J. Gibson).

Specifically, in the view adjustment method as the first embodiment of the present invention, as shown in FIG. 1, the view adjustment portion 10 is provided with granular textures arranged in concentric ellipses around the vicinity of the vertex T on the interior surface thereof. Herein, the concentric ellipses further from the center have larger radius. To cause the "texture gradient phenomenon", size of the textures is minimized in the vicinity of the vertex T and increases with increasing the distance from the vertex T.

Figure 7A:
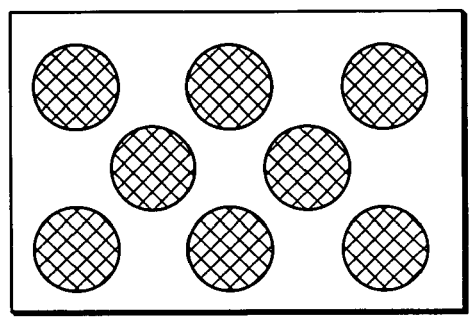
FIGS. 7A to 7C are views showing examples of a texture provided for an interior surface of a view adjustment portion in the vehicle adjustment method for a vehicle as the first embodiment of the present invention.
Figure 7B:
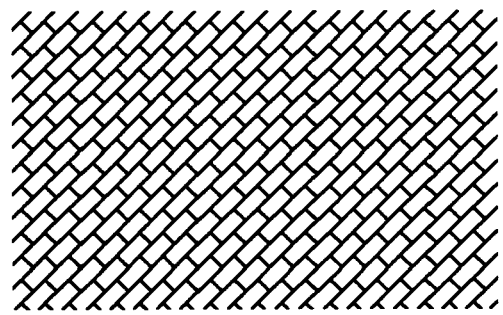
Figure 7C:
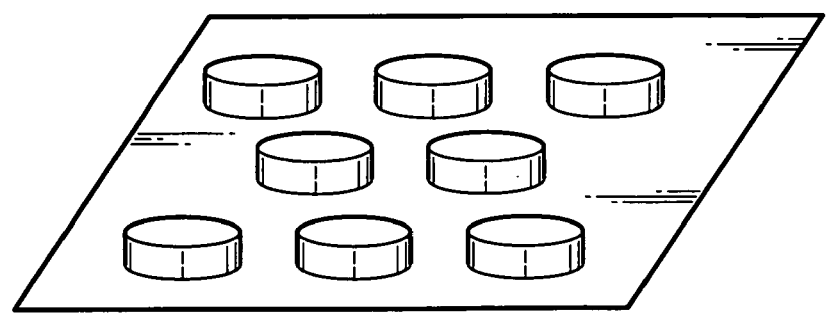

The texture provided for the view adjustment portion 10 is not limited to the granular texture and may be a gray scale texture defined by tones between white and black as shown in FIG. 7A, a linear texture as shown in FIG. 7B, and an uneven texture (a so-called "embossed texture") composed of minute inequalities as shown in FIG. 7C.

If the background and lines are in intermediate colors between white and black, the linear texture shown in FIG. 7B is the gray scale texture the same as that shown in FIG. 7A. The linear texture may be a color texture in which different colors are assigned to the background and the lines. In this embodiment, the view adjustment portion 10 is provided with the textures with regular size and shape but may be provided with textures having randomly varying size and shape.

As apparent from the above description, in the view adjustment method as the first embodiment of the present invention, any one of the color, luminosity, and uneven textures is provided on the interior surface of the vehicle adjustment portion 10, and the driver's visual focus is directed in the travel direction of the vehicle. Such a structure can prevent the driver's visual focus to be directed to a specific position of the view adjustment portion 10 and guide the driver's visual focus in the travel direction of the vehicle. Accordingly, it is possible to prevent the driver from feeling disturbance by the view adjustment portion 10.

In the view adjustment method as the first embodiment of the present invention, the view adjustment portion 10 includes the vertex T arranged at the position offset from the driver between the position P1 opposed to the driver and the vehicle center position P0 and includes the left and right edges Rr and Rl uniformly sloped down from the vertex T toward each side in the vehicle width direction. Moreover, a texture densest and finest in the vicinity of the vertex T is provided on the interior surface of the vehicle adjustment portion 10 to guide the driver's visual focus in the vehicle travel direction. Such a structure can prevent the driver's visual focus to be directed to the vicinity of the vertex T of the view adjustment portion 10 and guide the driver's visual focus in the vehicle travel direction. Accordingly, it is possible to prevent the driver from feeling disturbance by the view adjustment portion 10.

Figure 8A:
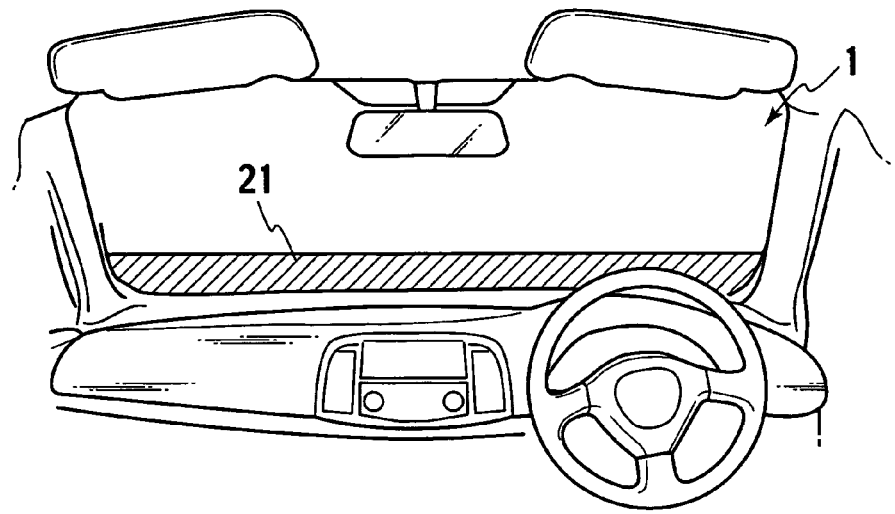
FIGS. 8A and 8B are views for explaining a view adjustment method for a vehicle as a second embodiment of the present invention.
Figure 8B:
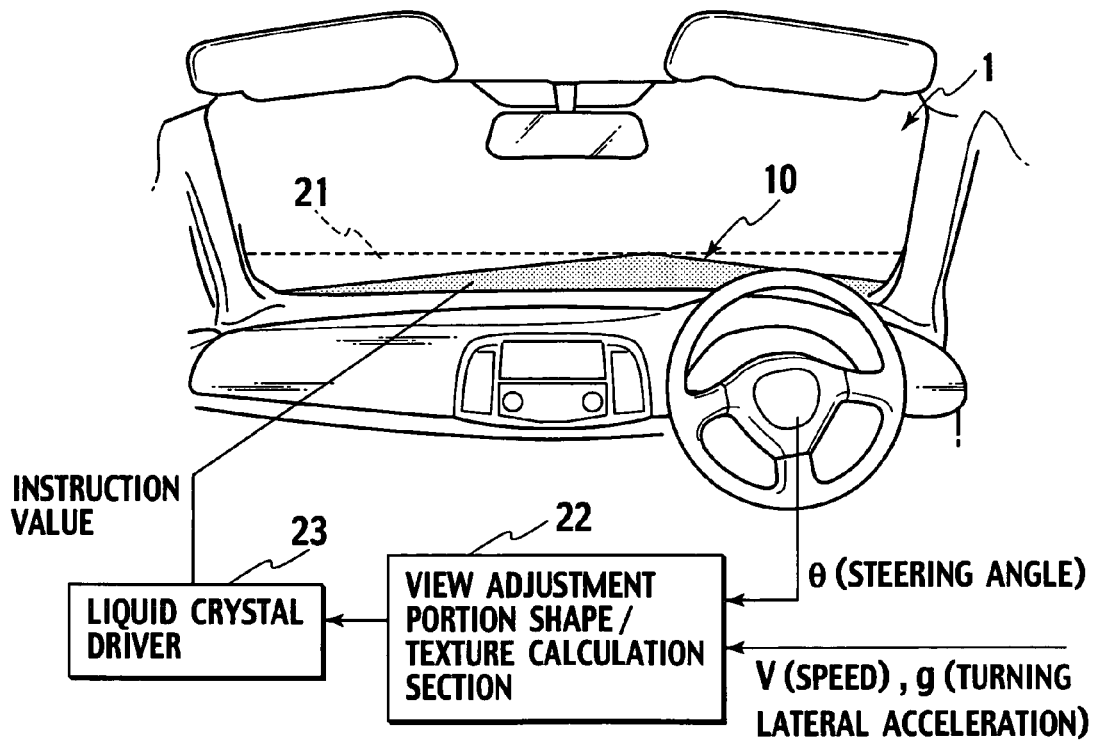
Figure 9A:
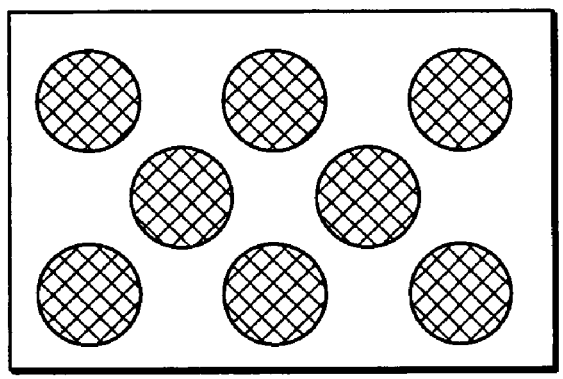
FIGS. 9A and 9B are views showing textures provided for the interior surface of the view adjustment portion during low-speed travel and high-speed travel, respectively, in the view adjustment method for a vehicle as the second embodiment of the present invention.
Figure 9B:
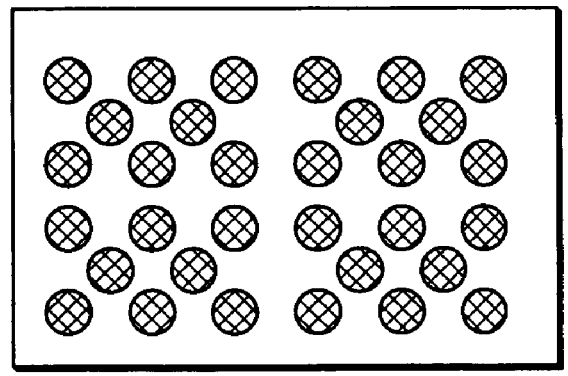

In a view adjustment method as the second embodiment of the present invention, as shown in FIG. 8A, a transparent liquid crystal panel 21 is arranged to display the view adjustment portion 10 in a lower part of the front windshield 1. As shown in FIG. 8B, a view adjustment portion shape/texture calculation section 22 detects θ (steering angle) and V (speed) or g (turning lateral acceleration) as vehicle state quantities and controls a liquid crystal driver 23 to change the density and size of the textures provided for the view adjustment portion 10 according to the vehicle state quantities. Specifically, the view adjustment portion shape/texture calculation section 22 increases the size of the textures as shown in FIG. 9A when the vehicle is traveling at low speed and reduces the texture size as shown in FIG. 9B when the vehicle is traveling at high speed.

The liquid crystal driver 23 outputs an instruction value to the liquid crystal panel 21 according to control by the view adjustment portion shape/texture calculation section 22 to display the view adjustment portion 10 provided with a texture. With such a structure, a lower front field of view is secured while the vehicle is traveling at low speed, and the lower front field of view is screened while the vehicle is traveling at high speed, thus enhancing the safety in driving. Moreover, variation in the total area of the driver's field of view can be controlled to be small. Accordingly, it is possible to prevent the field of view from drastically changing at rapid acceleration or deceleration and thus obtain stable drive feeling. According to the view adjustment method as the second embodiment of the present invention, the density and size of the textures provided for the view adjustment portion 10 are changed according to the vehicle state quantities. It is therefore possible to provide textures tailored to the state of the vehicle.

Figure 10:
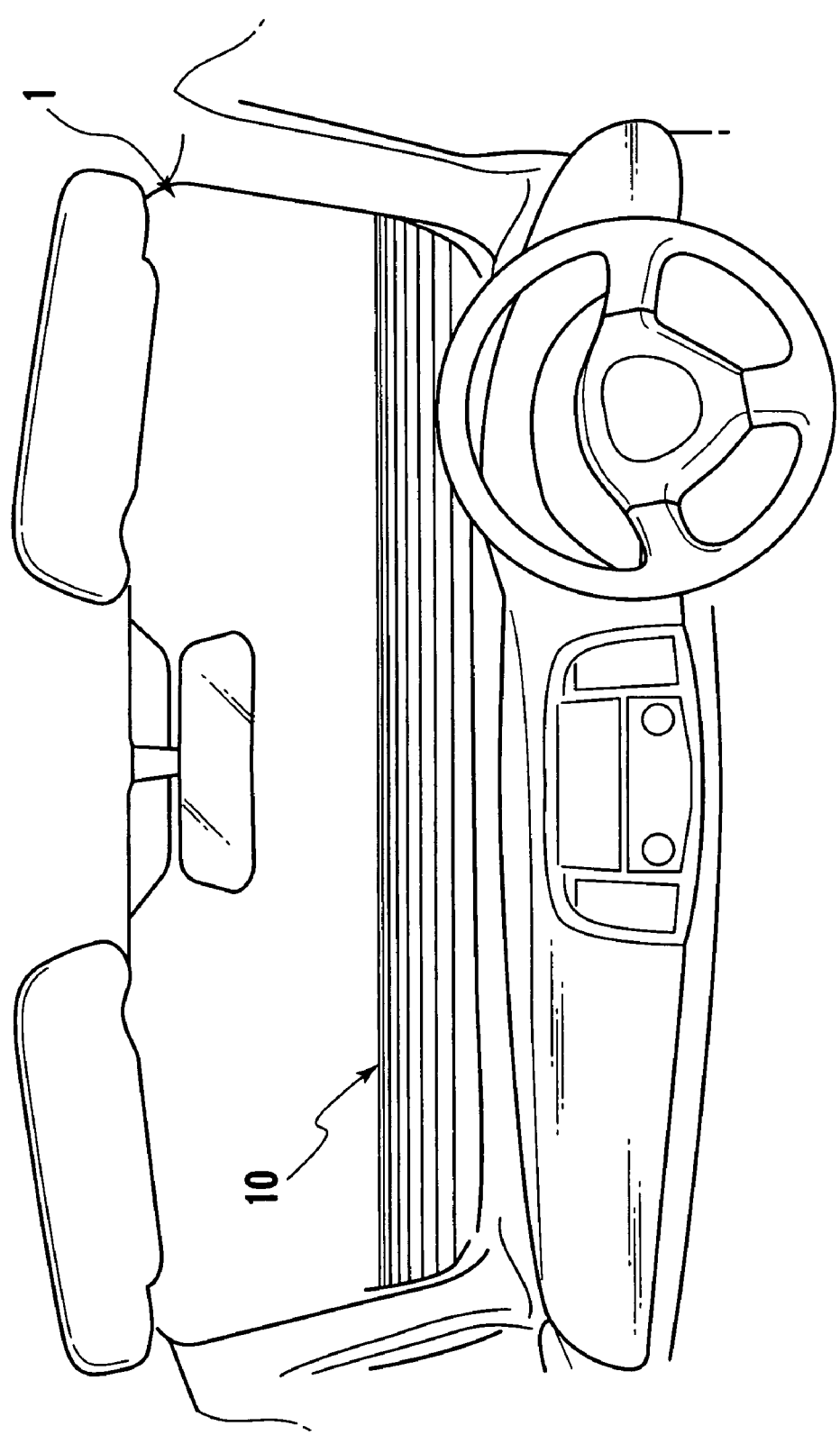
FIG. 10 is a view for explaining a view adjustment method for a vehicle as a third embodiment of the present invention.

In a view adjustment method as the third embodiment of the present invention, as shown in FIG. 10, the view adjustment portion 10 is formed to be substantially parallel to the lower end of the front windshield 1, and linear textures substantially parallel to the lower end of the front windshield 1 are provided on the interior surface of the view adjustment portion 10. Intervals between the lines constituting the textures get smaller toward the top of the view adjustment portion 10. With such a structure, the aforementioned "texture gradient phenomenon" is caused. This can prevent the driver's visual focus to be directed to a specific position of the view adjustment portion 10 and guide the driver's visual focus in the vehicle travel direction. It is therefore possible to prevent the driver from feeling disturbance by the view adjustment portion 10.

Figure 11A:
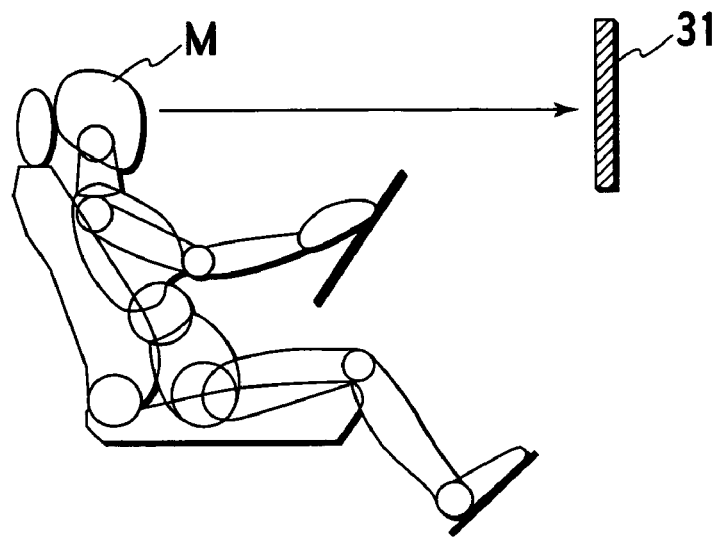
FIGS. 11A and 11B are views for explaining a method of providing a texture in a view adjustment method for a vehicle as a fourth embodiment of the present invention.
Figure 11B:
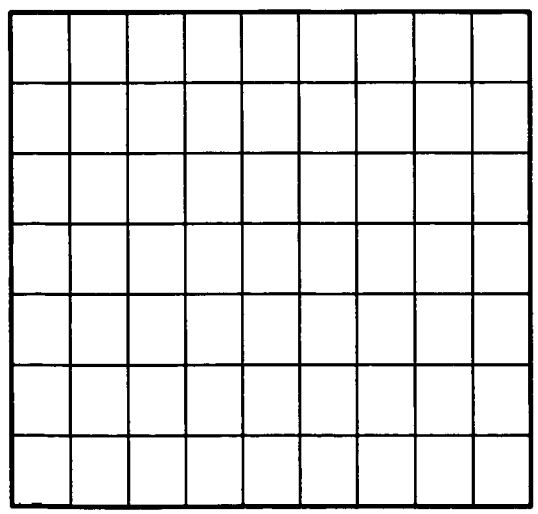
Figure 12A:
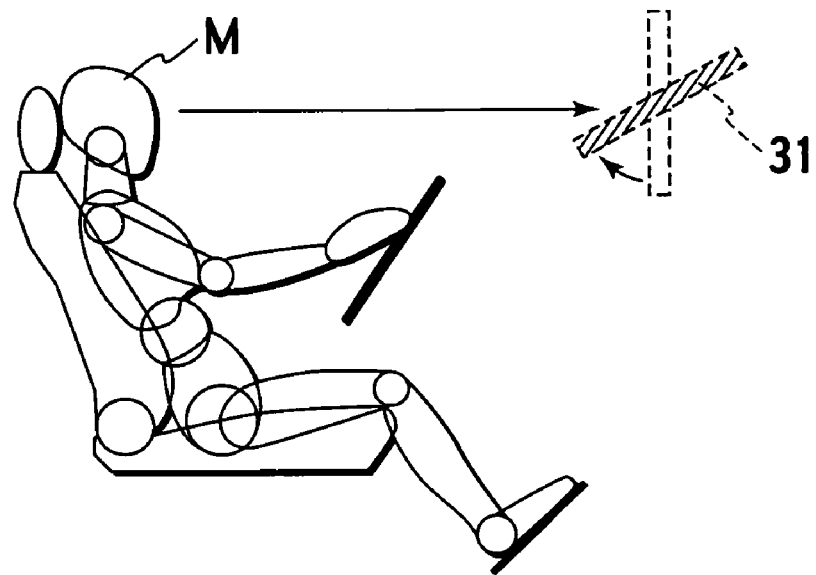
FIGS. 12A and 12B are views for explaining a method of providing a texture in the view adjustment method for a vehicle as the fourth embodiment of the present invention.
Figure 12B:
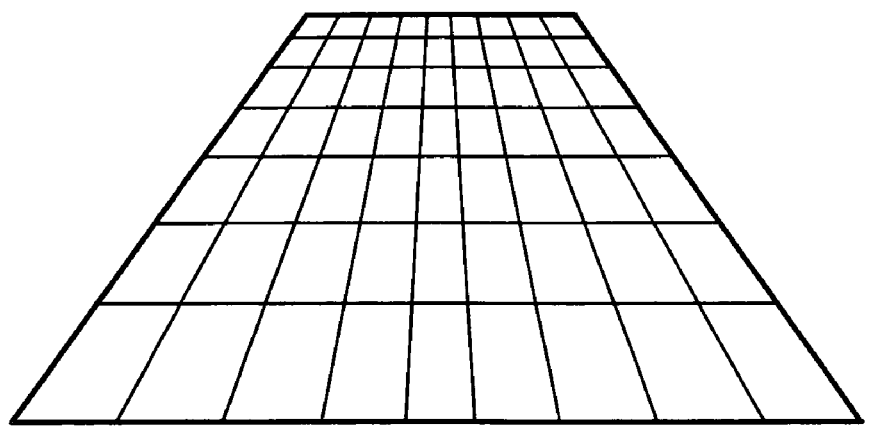
Figure 13A:
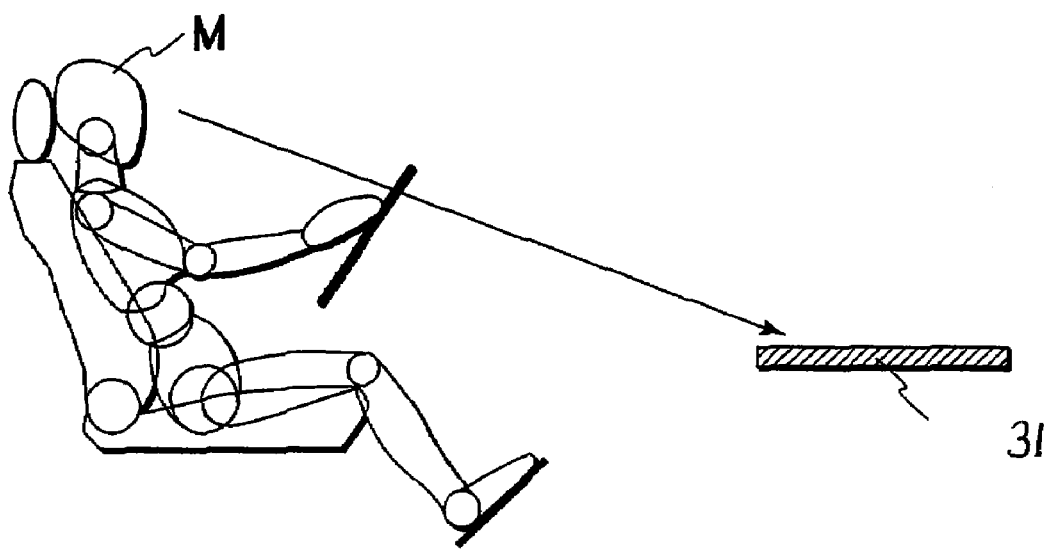
FIGS. 13A and 13B are views for explaining a method of providing a texture in an application example of the view adjustment method for a vehicle as the fourth embodiment of the present invention.
Figure 13B:
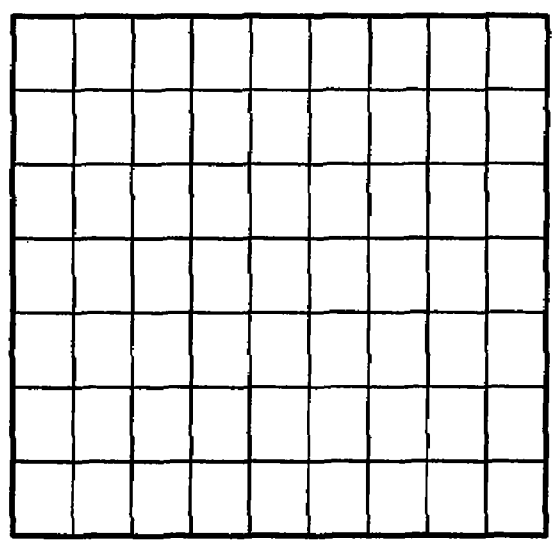
Figure 14A:
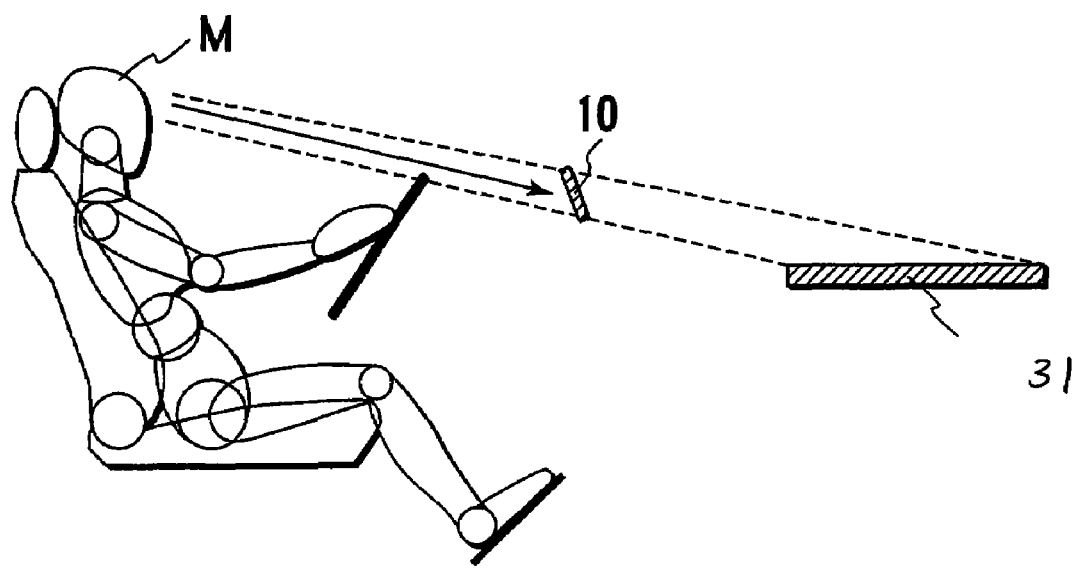
FIGS. 14A and 14B are views for explaining the method of providing a texture in the application example of the view adjustment method for a vehicle as the fourth embodiment of the present invention.
Figure 14B:
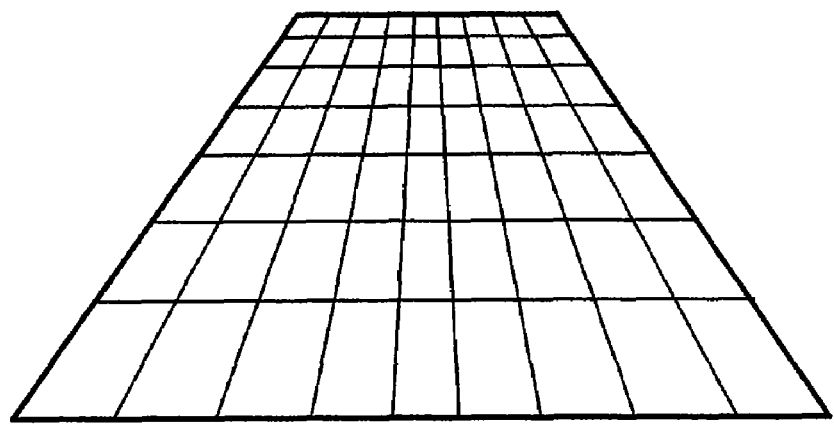
Figure 15A:
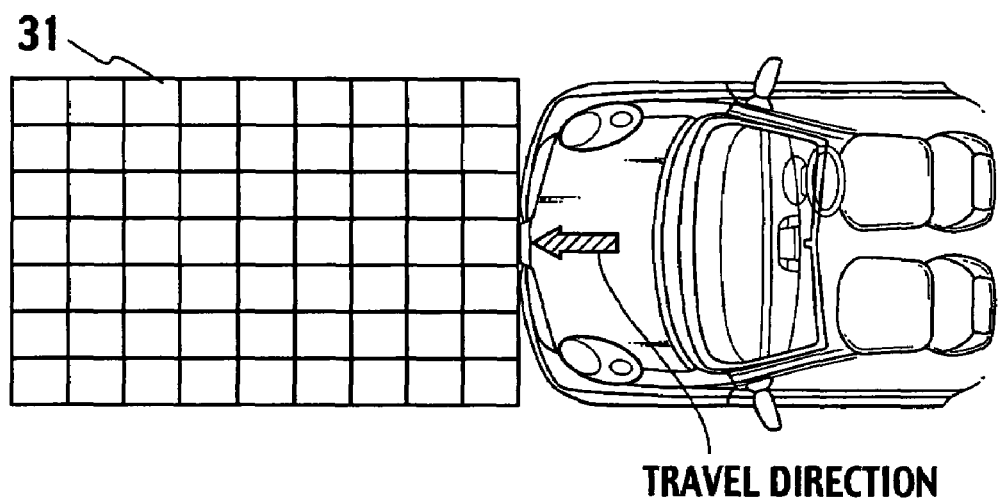
FIGS. 15A and 15B are views showing a form of a texture presented to the driver by the application example of the view adjustment method as the fourth embodiment of the present invention.
Figure 15B:
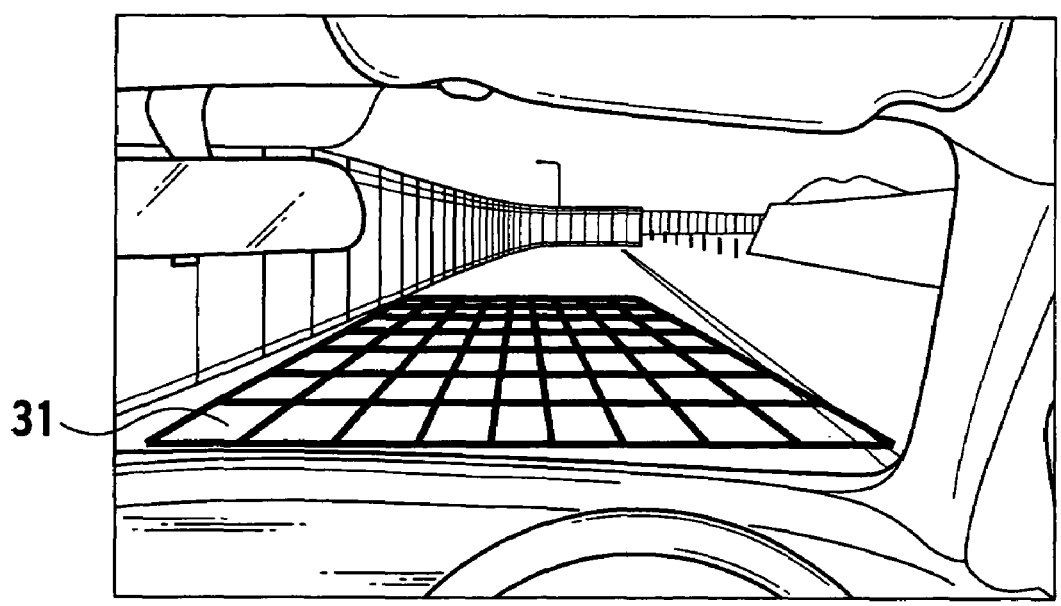

In a view adjustment method as the fourth embodiment of the present invention, a plane 31 is virtually defined at a position facing the driver M as shown in FIG. 11A. On the plane 31, a uniform grid texture shown in FIG. 11B is provided. A texture form (see FIG. 12B) which is obliquely viewed by the driver M when the plane 31 with the grid texture provided thereon is tilted in the vehicle travel direction as shown in FIG. 12A is provided for the view adjustment portion 10. Herein, in this embodiment, the grid texture is provided on the plane 31, but the present invention is not limited to this form, and another texture form may be provided. As an application example of this embodiment, the plane 31 substantially parallel to the road surface is defined in front of the driver M as shown FIG. 13A, and a grid texture shown in FIG. 13B is provided on this plane 31. A texture (see FIG. 14B) obtained by projecting the plane 31 with the grid texture on the view adjustment portion 10 (front windshield 1) as shown in FIG. 14A is provided on the view adjustment portion 10. A texture as shown in FIGS. 15A and 15B is therefore presented for the driver. In the case of implementing an application example of this embodiment, as shown in FIG. 16, it is desirable that positions of textures provided for the view adjustment portion 10 are calculated such that intervals between points B', C', D', and E', at which line segments connecting a viewpoint A and textures B, C, D, and E at regular intervals intersect the surface of the front windshield, get smaller toward the top of the view adjustment portion 10. According to the view adjustment method as the fourth embodiment of the present invention, the arrangement positions of the textures provided for the view adjustment portion 10 are determined according to a geometric relationship. Accordingly, the texture gradient can be accurately reproduced, thus enhancing the effect that prevents the driver from feeling disturbance by the view adjustment portion 10.

Figure 17A:
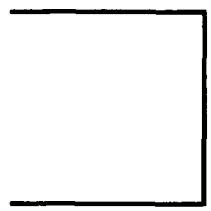
FIGS. 17A to 17E are views showing textures provided for the interior surface of the view adjustment portion in a view adjustment method for a vehicle as a fifth embodiment of the present invention.
Figure 17B:
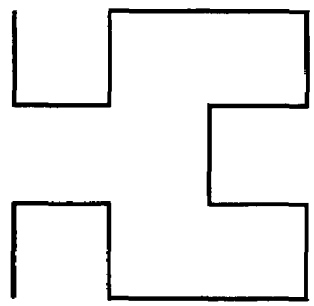
Figure 17C:
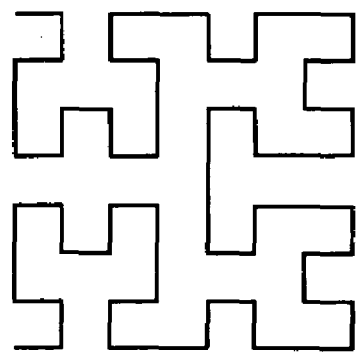
Figure 17D:
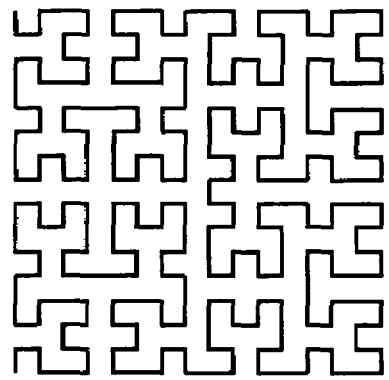
Figure 17E:
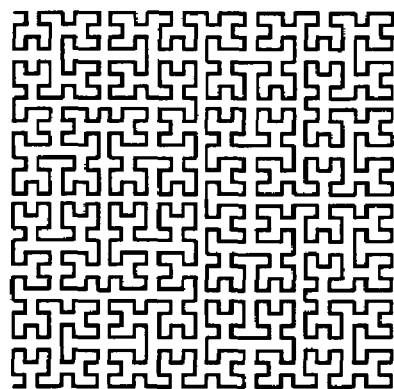

In a view adjustment method as the fifth embodiment of the present invention, a texture shown in FIG. 17E is provided on the interior surface of the view adjustment portion 10. Herein, the texture shown in FIG. 17E is formed by assuming an angular U-shaped base figure shown in FIG. 17A and repeating an operation to joint a plurality of the base figures. Each of the textures shown in FIGS. 17A to 17E is a Peano curve, which is one of fractals and has a self-similarity, which is a characteristic of fractals. The self-similarity means that any part cut off the original figure includes a portion similar to the original figure. Accordingly, the view arrangement portion 10 provided with such a Peano curve can prevent the driver's visual focus to be directed to a specific position of the view adjustment portion 10.

Figure 18:
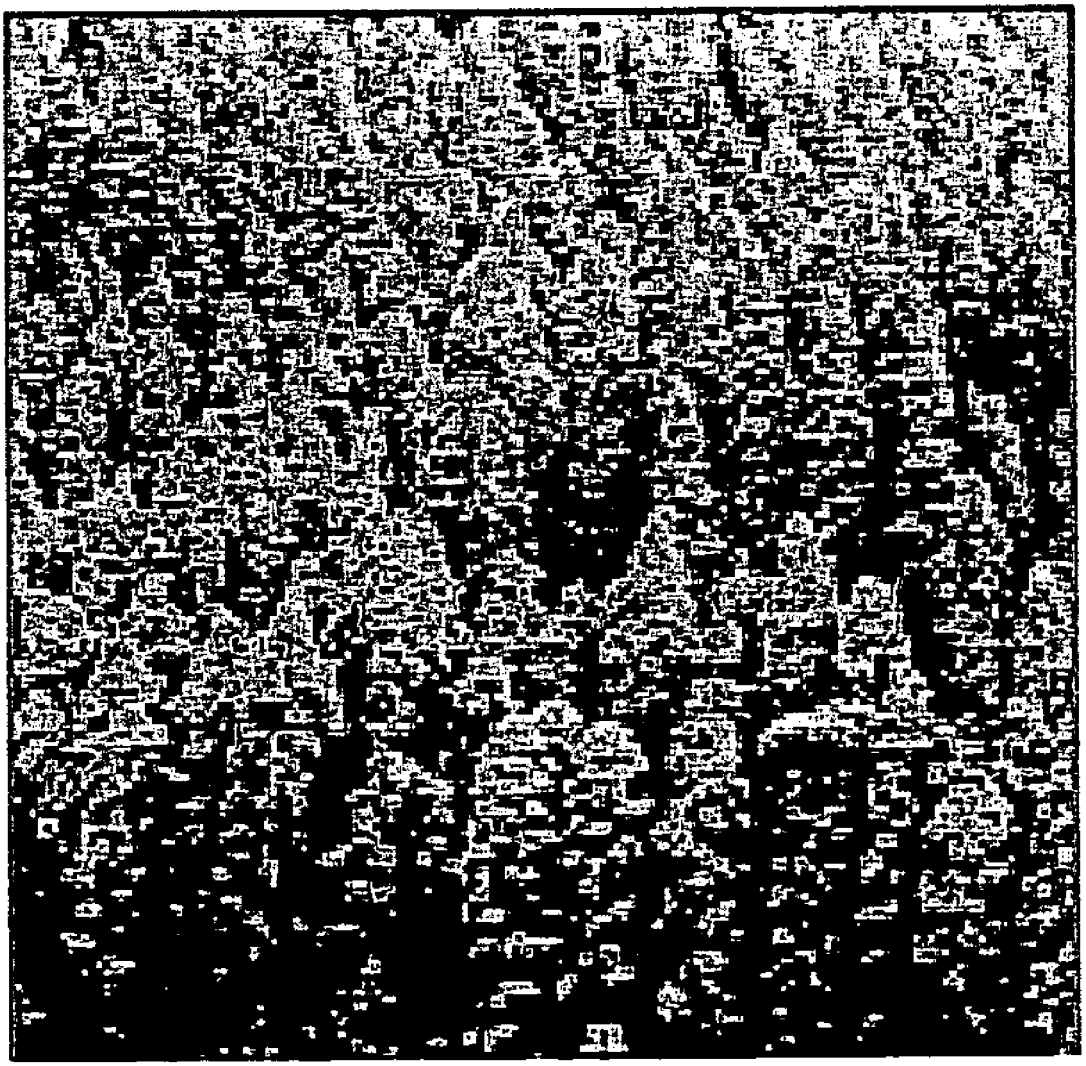
FIG. 18 is a view showing a texture provided for the interior surface of the view adjustment portion in an application example of the view adjustment method for a vehicle as the fifth embodiment of the present invention.

In this embodiment, the Peano curve is provided for the view adjustment portion 10 as the fractal. However, the present invention is not limited to the Peano curve, and other fractals such as a Mandelbrot set figure can be used. For example, a texture which is a reproduction of the appearance of forests as shown in FIG. 18, not only the geometrically and mathematically formed figures, may be provided for the view adjustment portion 10 because natural landscapes including forests and coastlines form fractals. According to the view adjustment method as the fifth embodiment of the present invention, the driver's attention is not directed to the view adjustment portion 10, thus preventing the driver from feeling disturbance by the view adjustment portion 10.

Figure 19A:
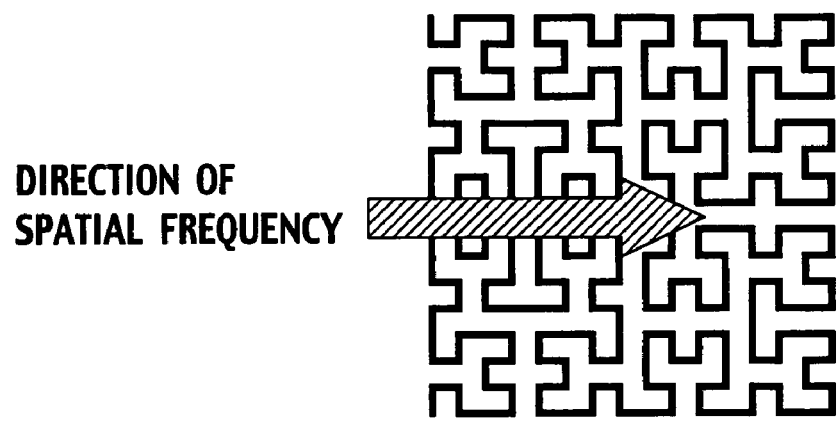
FIGS. 19A and 19B are views for explaining a general characteristic of a power spectrum of texture in a certain direction.
Figure 19B:
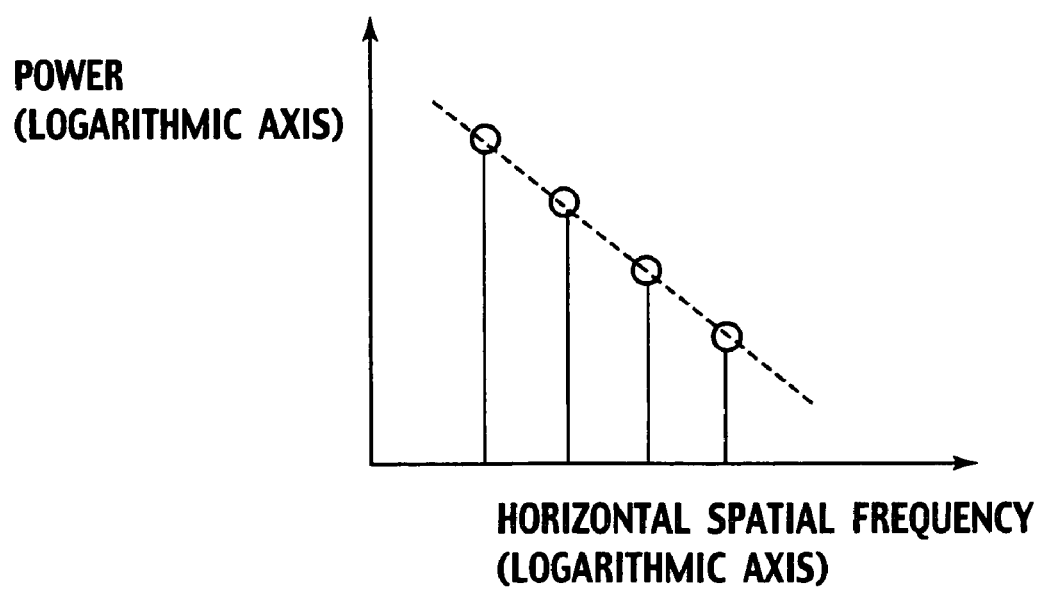
Figure 20A:
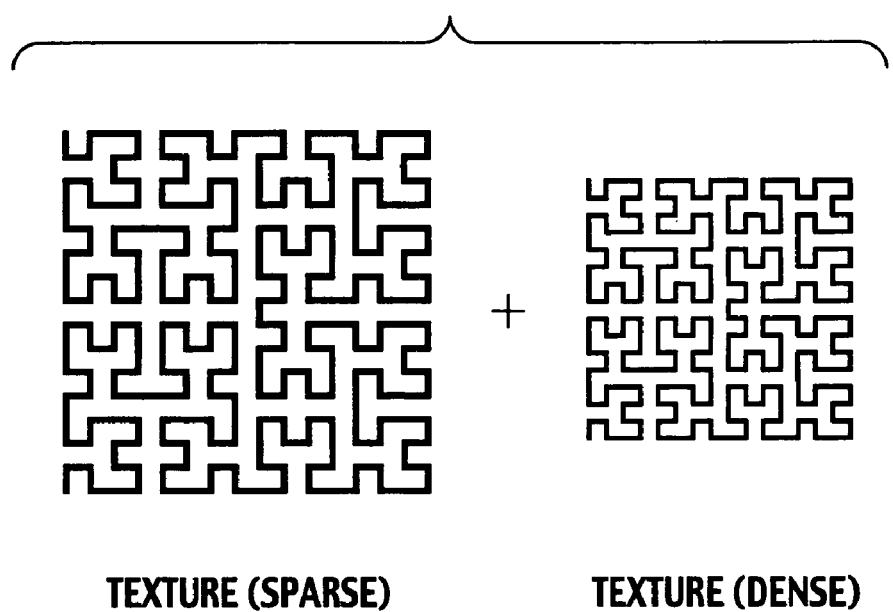
FIGS. 20A and 20B are a view for explaining a characteristic of a power spectrum of a texture provided for the interior surface of the view adjustment portion in a certain direction in a view adjustment method for a vehicle as a sixth embodiment of the present invention.
Figure 20B:
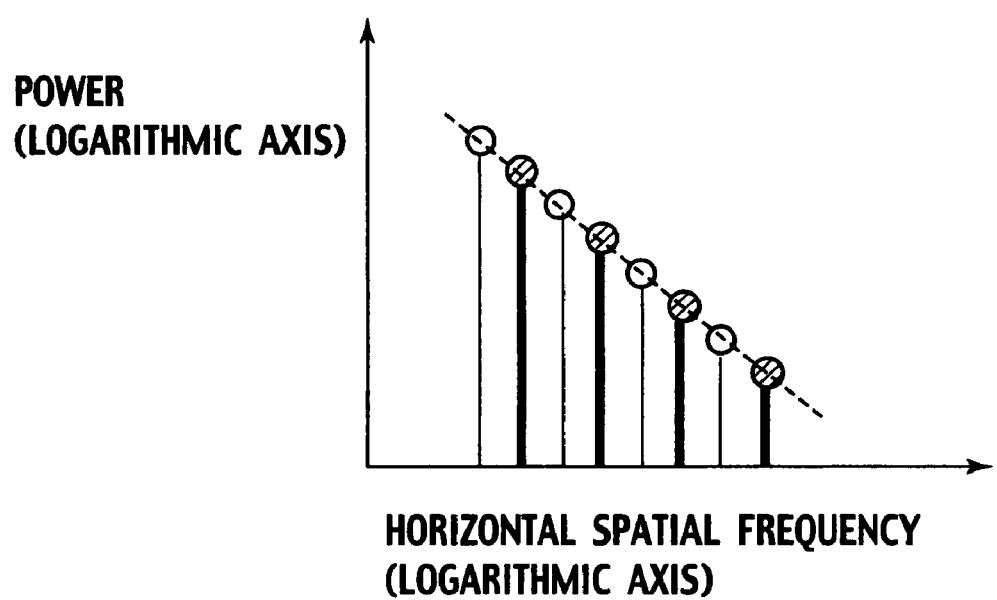

As described above, a fractal is formed by connecting a plurality of base figures geometrically scaled-down. As shown in FIGS. 19A and 19B, therefore, a spatial frequency of a fractal in a certain direction includes geometric frequency components, and the power spectrum of density or color of the texture is proportional to the reciprocal of the-spatial frequency. However, in the case of using a single fractal, the power spectrum exhibits a discrete characteristic as shown in FIG. 19B, and a 1/f fluctuation characteristic cannot be reproduced. In the view adjustment method as a sixth embodiment of the present invention, two same fractals slightly different in roughness are superposed on each other and provided on the interior surface of the view adjustment portion 10 so that the power spectrum exhibits a continuous characteristic as shown in FIG. 20B. With such a structure, the power spectrum of the spatial frequency of the texture provided for the view adjustment portion 10 exhibits the 1/f fluctuation characteristic, which can give a sense of stability in a steady traveling state in which the driver's head does not move relative to the vehicle body. In this embodiment, two fractals superposed on each other are provided as the texture, but more than two fractals superposed on each other may be provided as the texture so that the power spectrum exhibits a more continuous characteristic. The texture in this embodiment may be provided in consideration of the geometrical relationship similar to the application example of the view adjustment method as the fourth embodiment.

Figure 21A:
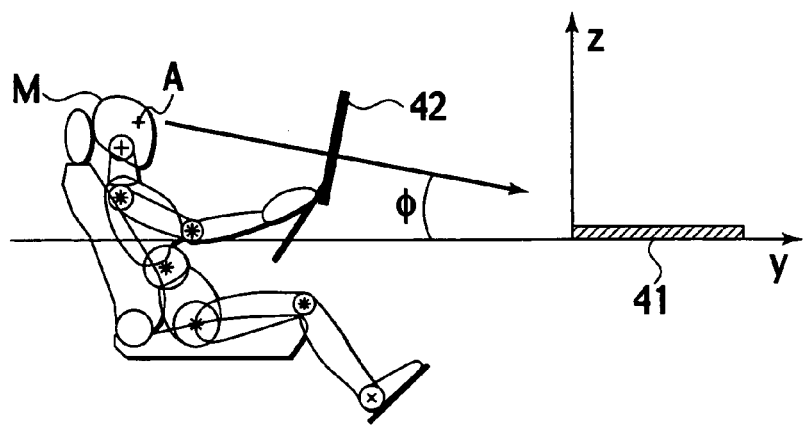
FIGS. 21A to 21C are views for explaining a method of providing a texture in a view adjustment method for a vehicle as a seventh embodiment of the present invention.
Figure 21B:
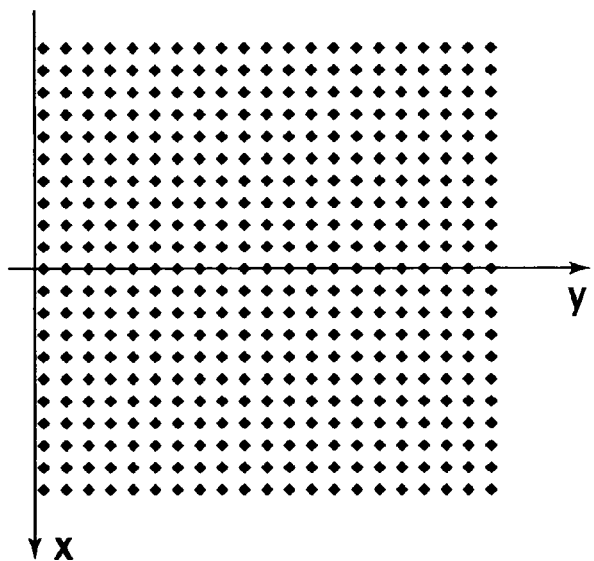
Figure 21C:
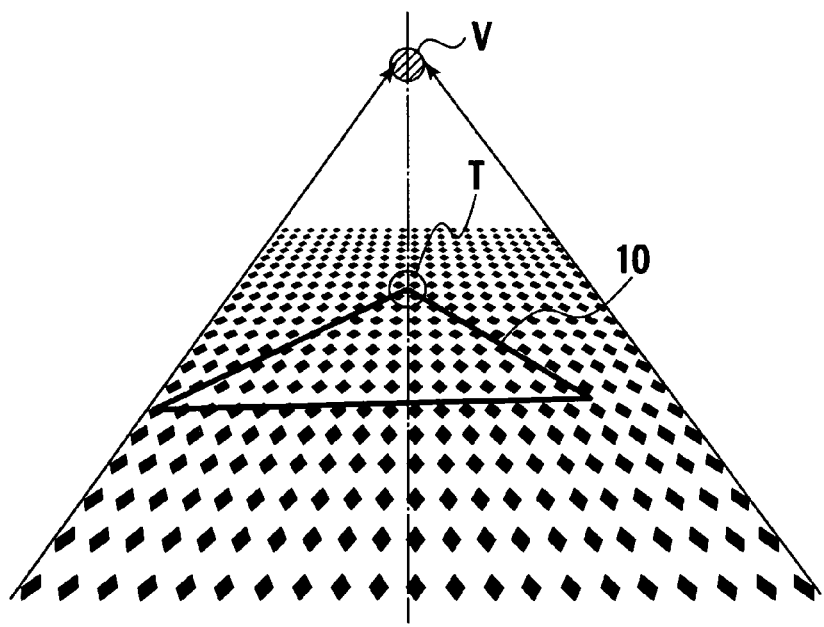

In a view adjustment method as a seventh embodiment of the present invention, a virtual plane 41 is defined in a horizontal (x, y) direction with respect to the vehicle as shown in FIG. 21A, and on this plane 41, a uniform texture shown in FIG. 21B is arranged. Figures on the plane 41 are converted into figures (hereinafter, referred to as obliquely-viewed figures) recognized when the driver M obliquely views the plane 41, and then as shown in FIG. 21C, the obliquely-viewed figures are provided for the view adjustment portion 10 such that the lateral position of a vanishing point V of the obliquely-viewed figures coincides with the vehicle lateral position of the vertex T of the view adjustment portion 10.

In the conversion of the figures on the plane 41 into the obliquely-viewed figures, first, axes x, y, and z (the axes x, y, and z indicate the vehicle lateral direction, the vehicle travel direction, and a vehicle height direction, respectively) are set on the plane 41, and coordinates of a certain point on the plane 41, coordinates of the viewpoint A of the driver M, and an angle of elevation of the viewpoint A are set to (x, y, z), $(x_e, y_e, z_e)$, and $\phi$, respectively. The coordinates (x, y, z) on the plane 41 are converted into the viewpoint coordinates $(x_v, y_v, z_v)$ by a matrix computation expressed by the following equation (1). Based on the result of the conversion, a conversion process expressed by the following equation (2) is performed to form the obliquely-viewed figures on a projection plane 42 orthogonal to the direction of the driver M's line of sight.

$$\begin{bmatrix} xv \\ yv \\ zv \end{bmatrix} = \begin{bmatrix} 0 & 1 & 0 \\ -\sin\phi & 0 & \cos\phi \\ -\cos\phi & 0 & \sin\phi \end{bmatrix} \begin{bmatrix} x - x_e \\ y - y_e \\ z - z_e \end{bmatrix} \quad (1)$$

$$\begin{bmatrix} X \\ Y \end{bmatrix} = \frac{1}{zv} \begin{bmatrix} xv \\ yv \end{bmatrix} \quad (2)$$

Figure 22A:
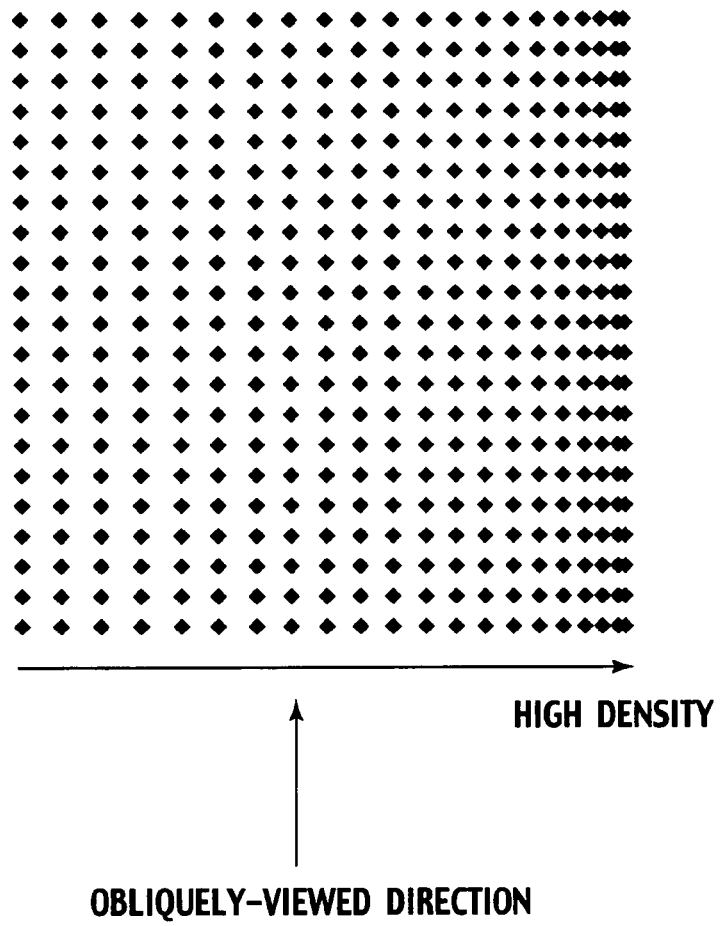
FIGS. 22A and 22B are views showing a texture provided for the interior surface of the view adjustment portion in an application example of the view adjustment method for a vehicle as the seventh embodiment of the present invention.
Figure 22B:
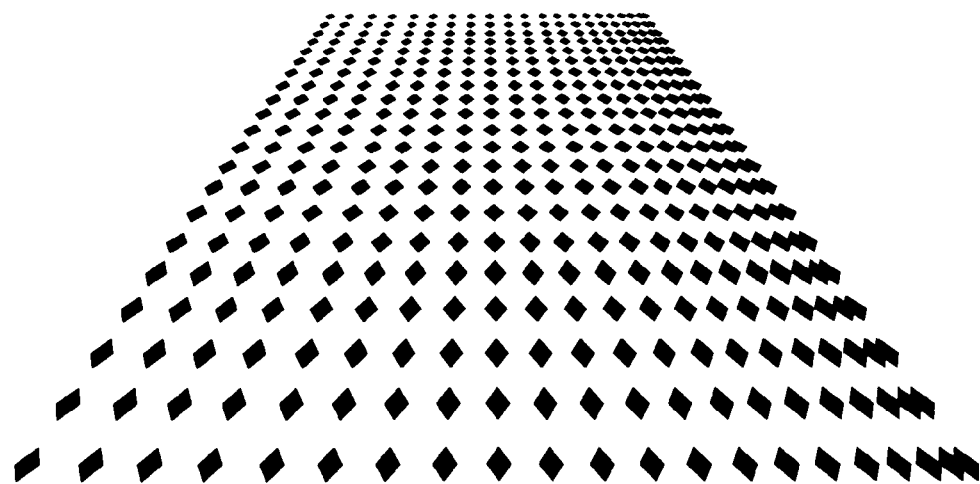

In the aforementioned embodiment, the figures are evenly arranged in the plane 41 as shown in FIG. 21B. However, the figures may be arranged so as to have a density distribution in the direction (vehicle lateral direction) substantially orthogonal to the direction (hereinafter, referred to as an obliquely-viewed direction) that the driver M obliquely views the plane 41. More specifically, as shown in FIG. 22A, the figures may be arranged such that intervals of the figures in the lateral direction (direction substantially orthogonal to the obliquely-viewed direction) change in a logarithmic scale. With such a structure, as shown in FIG. 22B, a texture gradient is provided in the lateral direction as well as in the vertical direction by the conversion into the obliquely-viewed figures. When the obliquely-viewed figures are applied to the view adjustment portion 10, therefore, it is possible to provide a density gradient in which the density of the figures is maximized in the vicinity of the vertex of the view adjustment portion 10 and increased from the left toward the right in the vehicle.

Figure 23:
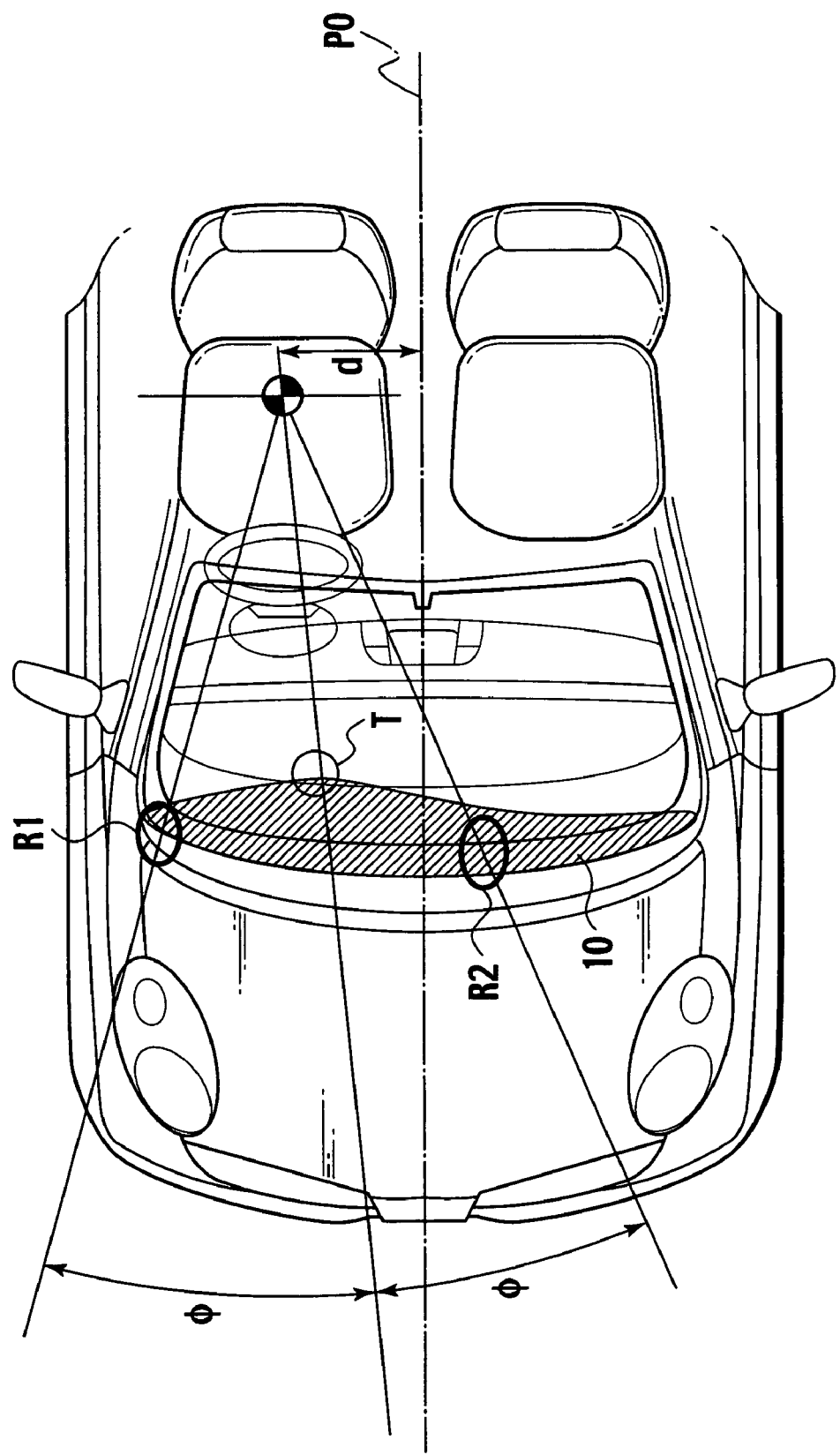
FIG. 23 is a view for explaining a difference between texture gradients in regions which are at horizontally symmetric positions with respect to a vertex of the view adjustment portion and at a same height.

In other words, as shown in FIG. 23, viewed from the driver's viewpoint A, as for regions R1 and R2 located at positions which are horizontally symmetric (both angles with respect to the line of sight are $\phi$) with the vertex T of the view adjustment portion 10 interposed therebetween and at a same height, the texture density of the figures within the region R1 is higher than that within the region R2. In a general right-hand drive vehicle, a right pillar is positioned near the driver, and the space right to the driver is smaller than the left space (on the passenger side). However, the texture density increasing toward the right (the driver's side) can allow the driver to feel that the region R1 is located further than the actual position, and the driver can feel that the right space is wider than the actual space. In a general right-hand drive vehicle, the space around the driver's seat is asymmetric, causing asymmetry in driving operations. However, making the driver recognize a visual space distorted with respect to the real space as described above eliminates the asymmetry in driving operations. In an application to the left-hand drive vehicle, obviously, it is only necessary that the texture gradient is horizontally reversed.

Figure 24A:
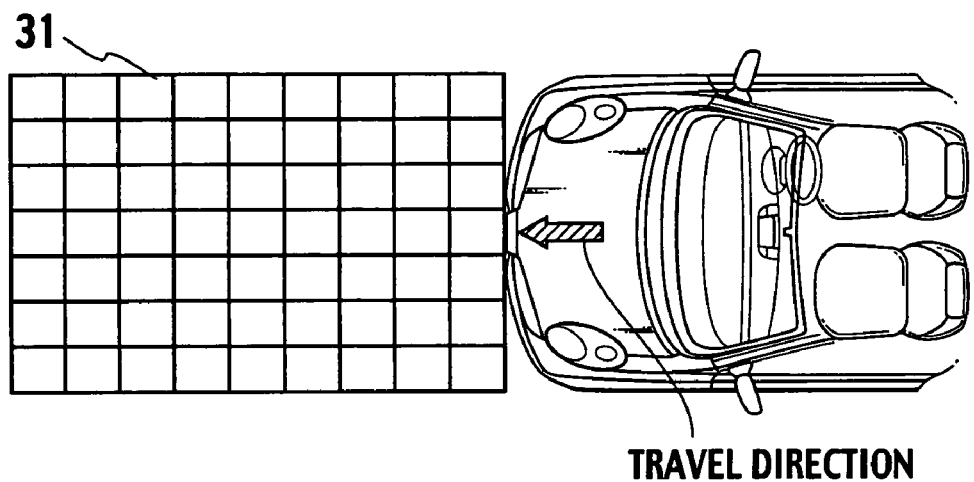
FIGS. 24A and 24B are views for explaining an application example of the view adjustment method for a vehicle as the fourth embodiment of the present invention.
Figure 24B:
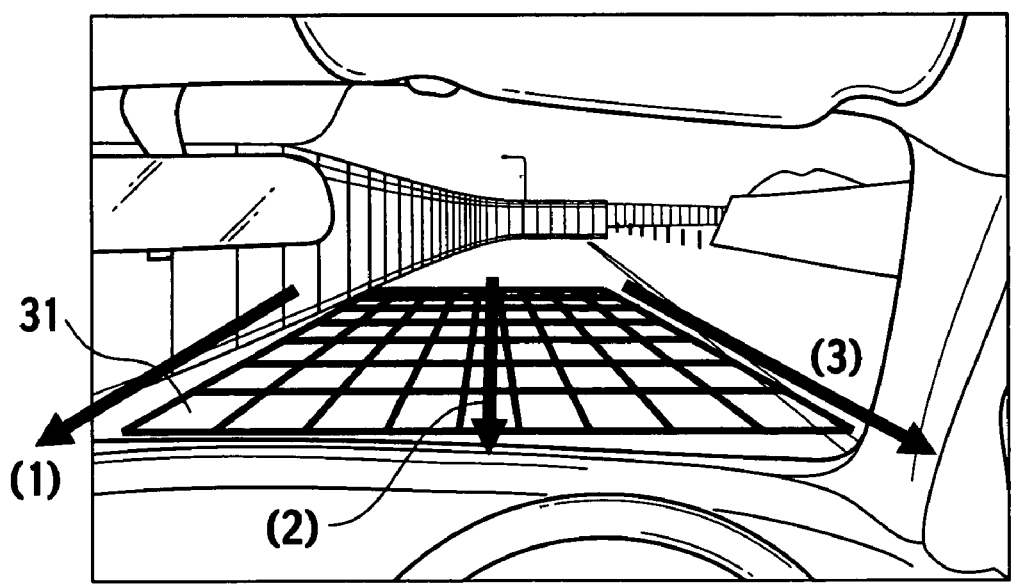
Figure 25A:
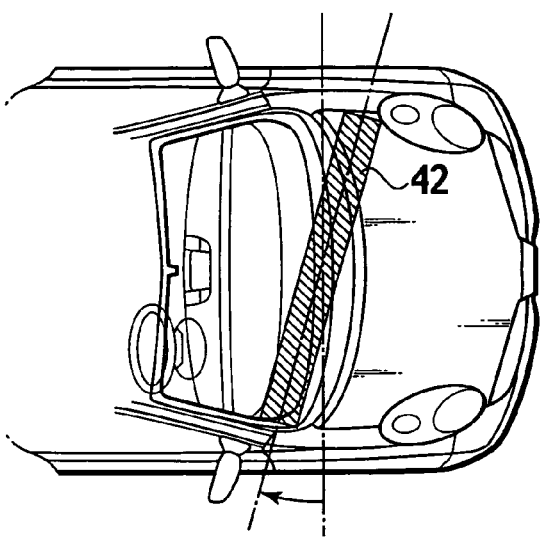
FIGS. 25A to 25C are views for explaining an application example of the view adjustment method for a vehicle as the seventh embodiment of the present invention.
Figure 25B:
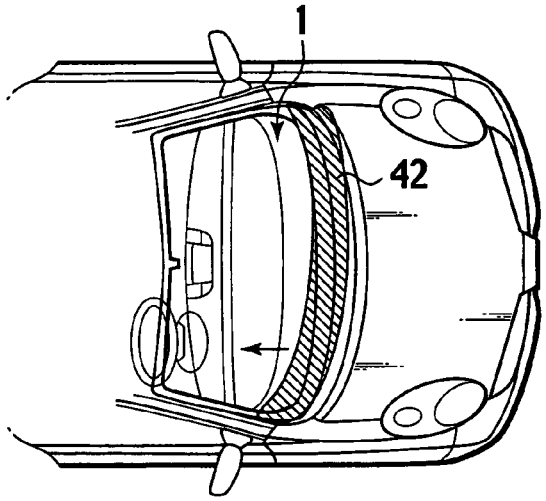
Figure 25C:
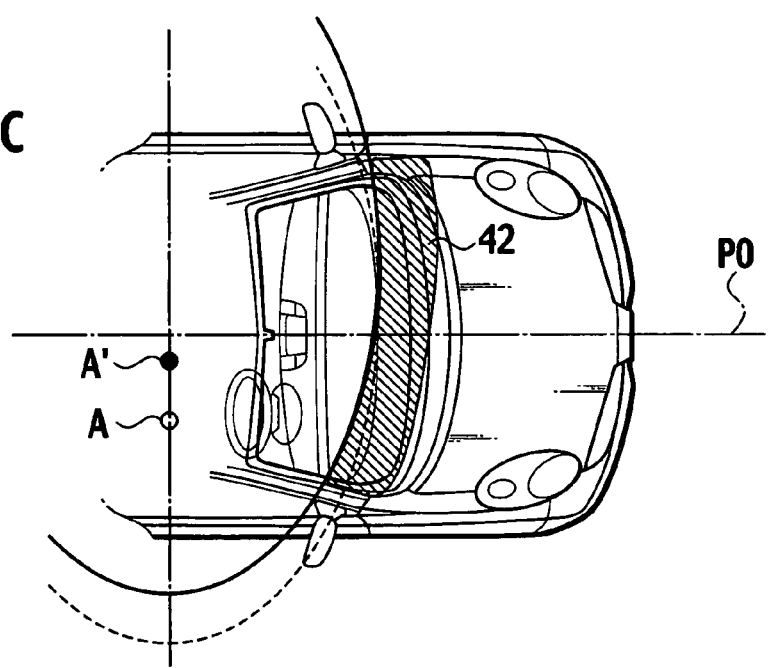

The above description is given of the embodiments to which the invention made by the inventors is applied, but the present invention is not limited by the description and drawings constituting a part of the disclosure of the present invention by these embodiments. In the view adjustment method as the fourth embodiment, for example, as shown in FIGS. 24A and 24B, the plane 31 with the grid texture substantially parallel to the road surface in the vehicle travel direction is virtually defined, and a texture obtained by projecting the plane 31 on the view adjustment portion 10 is provided for the view adjustment portion 10. In this case, spatial frequencies in directions (1), (2), and (3) shown in FIG. 24B are different from one another. Specifically, the spatial frequency in the direction (2) is higher than the spatial frequencies in the directions (1) and (3). Accordingly, it is desirable that a distribution or absolute values of the spatial frequencies on the separating line of the view adjustment portion 10 on the outside is substantially matched with that on the vehicle interior side. Such a structure can effectively suppress the afterimage in the driver's eye against the change in the field of view when the driver moves relative to the vehicle. In the view adjustment method as the seventh embodiment, the plane with uniform textures arranged thereon is projected to provide the texture having a texture gradient for the view adjustment portion. However, it is possible to set a projection plane 42 which is inclined with respect to the bottom line of the front windshield when viewed from above the vehicle (in the case of a right-hand drive vehicle, the plane is closer to the driver's seat on the vehicle right side), project a plane having a uniform texture arranged thereon on the set projection plane 42, and attach the texture formed on the projection plane 42 to the view adjustment portion 10. Herein, the projection plane 42 is set to be inclined in the following manners. The projection plane 42 is set to have an angle with respect to the vehicle lateral direction (see FIG. 25A), or the right part of the projection plane 42 is brought closer to the driver's seat from the frame of the front windshield 1 (see FIG. 25B). Alternatively, a virtual view point A' is placed between the viewpoint A and the vehicle center axis P0, and a part of an elliptic plane with one focus at the virtual viewpoint A' is set as the projection plane 42 (see FIG. 25C). With such a method, it is possible to provide the texture having the texture gradient for the view adjustment portion 10 by means of an easy method without computation processing. In an application to the left-hand drive vehicle, obviously, it is only necessary that the inclination direction of the projection plane 42 is reversed. It is obvious that all other embodiments, examples, and operational technologies made by those skilled in the art based on the aforementioned embodiments are within the scope of the present invention.

The entire content of Japanese Patent Application No. TOKUGAN 2004-182740 with a filing date of Jun. 21, 2004, and Japanese Patent Application No. TOKUGAN 2004-371541 with a filing date of Dec. 22, 2004, is hereby incorporated by reference.

What is claimed is:

1. A view adjustment method for a vehicle in which a view adjustment portion is provided in a lower part of a front windshield to adjust a driver's front field of view, comprising the step of:
providing textures defined by any one of color, luminosity, and unevenness for a part of or an entire interior surface of the view adjustment portion to guide a driver's visual focus by means of the textures in a travel direction of the vehicle.

2. The view adjustment method for a vehicle according to claim 1, wherein density and size of the textures vary according to a state quantity of the vehicle.

3. The view adjustment method for a vehicle according to claim 1, wherein the textures increase in density and are reduced in size toward a top of the front windshield.

4. The view adjustment method for a vehicle according to claim 1, wherein the view adjustment portion includes a vertex placed at a position offset from the driver between a position opposed to the driver and a center position of the vehicle and includes right and left edges sloped down from the vertex toward each side in a vehicle width direction, and the provided textures are densest and smallest at the vertex.

5. The view adjustment method for a vehicle according to claim 1, wherein the textures are composed of textures obliquely viewed from the driver when a plane facing the driver, on which uniformly distributed textures are defined, is inclined in the travel direction of the vehicle.

6. The view adjustment method for a vehicle according to claim 1, wherein the textures are composed of any one of a random shape and a fractal.

7. The view adjustment method for a vehicle according to claim 6, wherein density and size of the textures are adjusted to have a characteristic that a power spectrum of any one of color, luminosity, and unevenness of the textures in a certain direction is proportional to a reciprocal of spatial frequency.

8. The view adjustment method for a vehicle according to claim 1, wherein spatial frequency of the textures substantially coincides with spatial frequency of an external view on a separating line of the view adjustment portion.

9. The view adjustment method for a vehicle according to claim 1, wherein a driver's seat of the vehicle is offset from a center of the vehicle to either right or left; a texture having a gradient of density in a lateral direction of the vehicle is defined on a plane facing the driver; and the textures are composed of a texture obliquely viewed by the driver when the plane is inclined in the travel direction of the vehicle.

10. The view adjustment method according to claim 1, wherein a driver's seat of the vehicle is offset from a center of the vehicle to either right or left; and as for textures provided in two regions within the view adjustment portion which are axially symmetric in a lateral direction of the vehicle with a vertex of the view adjustment portion interposed therebetween and are at substantially the same height in a vertical direction of the vehicle, density and size of the textures provided for the region on a driver's side are relatively higher and smaller than those of the textures provided for the region on a passenger's side.

11. A view adjustment device for a vehicle adjusting a driver's front field of view, comprising:
a view adjustment portion in a lower part of a front windshield, wherein textures defined by any one of color, luminosity, and unevenness are provided for a part of or an entire interior surface of a part of the front windshield corresponding to the view adjustment portion and guide a position of the driver's visual focus by means of the textures in a travel direction of the vehicle.

12. The view adjustment device for a vehicle according to claim 11, wherein density and size of the textures vary according to a state quantity of the vehicle.

13. The view adjustment device for a vehicle according to claim 11, wherein the textures increase in density and are reduced in size toward a top of the front windshield.

14. The view adjustment device for a vehicle according to claim 11, wherein the view adjustment portion includes a vertex placed at a position offset from the driver between a position opposed to the driver and a center position of the vehicle and includes right and left edges sloped down from the vertex toward each side in a vehicle width direction, and the provided textures are densest and smallest at the vertex.

15. The view adjustment device for a vehicle according to claim 11, wherein the textures are composed of textures obliquely viewed from the driver when a plane facing the driver, on which uniformly distributed textures are defined, is inclined in the travel direction of the vehicle.

16. The view adjustment device for a vehicle according to claim 11, wherein the textures are composed of any one of a random shape and a fractal.

17. The view adjustment device for a vehicle according to claim 16, wherein density and size of the textures are adjusted to have a characteristic that a power spectrum of any one of color, luminosity, and unevenness of the textures in a certain direction is proportional to a reciprocal of spatial frequency.

18. The view adjustment device for a vehicle according to claim 11, wherein spatial frequency of the textures substantially coincides with spatial frequency of an external view on a separating line of the view adjustment portion.

19. The view adjustment device for a vehicle according to claim 11, wherein a driver's seat of the vehicle is offset from a center of the vehicle to either right or left; a texture having a gradient of density in a lateral direction of the vehicle is defined on a plane facing the driver; and the textures are composed of a texture obliquely viewed by the driver when the plane is inclined in the travel direction of the vehicle.

20. The view adjustment device for a vehicle according to claim 11, wherein a driver's seat of the vehicle is offset from a center of the vehicle to either right or left; and as for textures provided in two regions within the view adjustment portion which are axially symmetric in a lateral direction of the vehicle with a vertex of the view adjustment portion interposed therebetween and are at substantially the same height in a vertical direction of the vehicle, density and size of the textures provided for the region on a driver's side are relatively higher and smaller than those of the textures provided for the region on a passenger's side.

* * * * *